US010807041B2

(12) United States Patent
Nilsson et al.

(10) Patent No.: US 10,807,041 B2
(45) Date of Patent: *Oct. 20, 2020

(54) EXHAUST TREATMENT SYSTEM AND METHOD FOR TREATMENT OF AN EXHAUST GAS STREAM

(71) Applicant: Scania CV AB, Södertälje (SE)

(72) Inventors: Magnus Nilsson, Årsta (SE); Henrik Birgersson, Stockholm (SE)

(73) Assignee: Scania CV AB, Södertälje (SE)

( * ) Notice: Subject to any disclaimer, the term of this patent is extended or adjusted under 35 U.S.C. 154(b) by 45 days.

This patent is subject to a terminal disclaimer.

(21) Appl. No.: 15/750,168

(22) PCT Filed: Aug. 25, 2016

(86) PCT No.: PCT/SE2016/050796
§ 371 (c)(1),
(2) Date: Feb. 2, 2018

(87) PCT Pub. No.: WO2017/034465
PCT Pub. Date: Mar. 2, 2017

(65) Prior Publication Data
US 2018/0221820 A1 Aug. 9, 2018

(30) Foreign Application Priority Data
Aug. 27, 2015 (SE) ...................... 1551109

(51) Int. Cl.
B01D 53/94 (2006.01)
F01N 3/035 (2006.01)
(Continued)

(52) U.S. Cl.
CPC ..... B01D 53/9477 (2013.01); B01D 53/9495 (2013.01); F01N 3/021 (2013.01);
(Continued)

(58) Field of Classification Search
CPC ............ B01D 53/9477; B01D 53/9495; F01N 13/009; F01N 3/021; F01N 3/0231;
(Continued)

(56) References Cited

U.S. PATENT DOCUMENTS 5,120,695 A 6/1992 Blumrich et al.
5,239,860 A 8/1993 Harris et al.
(Continued)

FOREIGN PATENT DOCUMENTS

CN 101784767 A 7/2010
CN 101932803 A 12/2010
(Continued)

OTHER PUBLICATIONS

Machine Translation of JP-2015137583-A (Year: 2015).*
(Continued)

Primary Examiner — Brandon D Lee
(74) Attorney, Agent, or Firm — Moore & Van Allen PLLC; W. Kevin Ransom

(57) ABSTRACT

An exhaust treatment system arranged for treatment of an exhaust stream is presented. The exhaust treatment system comprises a first reduction catalyst device arranged for reduction of nitrogen oxides in said exhaust stream through the use of compounds comprising one or several of carbon monoxide and hydrocarbons, which are comprised in said exhaust stream when said exhaust stream reaches said first reduction catalyst device; a particulate filter which is arranged downstream of said first reduction catalyst device to catch and oxidize soot particles in said exhaust stream; a second dosage device arranged downstream of said particulate filter and arranged to supply an additive comprising ammonia or a substance from which ammonia may be extracted and/or released into said exhaust stream; and a second reduction catalyst device, arranged downstream of (Continued)

said second dosage device and arranged for reduction of nitrogen oxides in said exhaust stream through the use of said additive.

48 Claims, 6 Drawing Sheets

(51) Int. Cl.
| | | |
|---|---|---|
| F01N 3/20 | (2006.01) | |
| F01N 13/00 | (2010.01) | |
| F01N 3/021 | (2006.01) | |
| F01N 9/00 | (2006.01) | |
| F01N 3/023 | (2006.01) | |
| F01N 3/36 | (2006.01) | |
| F01N 3/10 | (2006.01) | |
| F01N 11/00 | (2006.01) | |

(52) U.S. Cl.
CPC ........... *F01N 3/0231* (2013.01); *F01N 3/035* (2013.01); *F01N 3/103* (2013.01); *F01N 3/106* (2013.01); *F01N 3/108* (2013.01); *F01N 3/208* (2013.01); *F01N 3/2066* (2013.01); *F01N 3/36* (2013.01); *F01N 9/00* (2013.01); *F01N 13/009* (2014.06); *F01N 11/005* (2013.01); *F01N 2250/02* (2013.01); *F01N 2430/08* (2013.01); *F01N 2610/02* (2013.01); *F01N 2610/03* (2013.01); *F01N 2900/0416* (2013.01); *F01N 2900/08* (2013.01); *F01N 2900/1602* (2013.01); *Y02T 10/24* (2013.01)

(58) Field of Classification Search
CPC .......... F01N 3/035; F01N 3/103; F01N 3/106; F01N 3/108; F01N 3/2066; F01N 3/208; F01N 3/36; F01N 9/00; F01N 11/005; F01N 2250/02; F01N 2430/08; F01N 2610/02; F01N 2610/03; F01N 2900/0416; F01N 2900/08; F01N 2900/1602; Y02T 10/24
See application file for complete search history.

(56) References Cited

U.S. PATENT DOCUMENTS

| | | | |
|---|---|---|---|
| 8,544,260 | B2 | 10/2013 | Boorse et al. |
| 9,670,855 | B2 | 6/2017 | Dickson et al. |
| 10,054,023 | B2 * | 8/2018 | Nilsson ................ F01N 3/208 |
| 10,260,391 | B2 * | 4/2019 | Nilsson ................ F01N 3/208 |
| 10,260,392 | B2 * | 4/2019 | Nilsson ................ F01N 3/208 |
| 10,267,197 | B2 * | 4/2019 | Nilsson ................ F01N 3/021 |
| 10,273,850 | B2 * | 4/2019 | Nilsson ................ F01N 3/208 |
| 10,273,851 | B2 * | 4/2019 | Nilsson ................ F01N 3/208 |
| 10,273,852 | B2 * | 4/2019 | Nilsson ................ F01N 3/208 |
| 10,344,647 | B2 * | 7/2019 | Nilsson ................ F01N 3/206 |
| 2003/0110761 | A1 * | 6/2003 | Minami ............. B01D 53/9431 60/280 |
| 2004/0040289 | A1 | 3/2004 | Mazur et al. |
| 2004/0098979 | A1 | 5/2004 | Hammerle et al. |
| 2005/0069476 | A1 | 3/2005 | Blakeman et al. |
| 2005/0232830 | A1 | 10/2005 | Bruck |
| 2006/0010857 | A1 | 1/2006 | Hu et al. |
| 2006/0039843 | A1 | 2/2006 | Patchett et al. |
| 2007/0122317 | A1 * | 5/2007 | Driscoll ................ B01D 53/90 422/170 |
| 2007/0150154 | A1 | 6/2007 | Lenz |
| 2008/0060348 | A1 | 3/2008 | Robel et al. |
| 2009/0031702 | A1 | 2/2009 | Robel |
| 2009/0035194 | A1 * | 2/2009 | Robel ................ F01N 3/0231 422/177 |
| 2009/0035195 | A1 | 2/2009 | Robel |
| 2009/0193794 | A1 | 8/2009 | Robel et al. |
| 2010/0024393 | A1 | 2/2010 | Chi et al. |
| 2010/0175372 | A1 | 7/2010 | Lambert et al. |
| 2010/0252737 | A1 | 10/2010 | Fournel et al. |
| 2010/0319320 | A1 * | 12/2010 | Mital ................ F01N 3/035 60/285 |
| 2011/0162347 | A1 | 7/2011 | Katare et al. |
| 2011/0211193 | A1 | 9/2011 | Saveliev et al. |
| 2011/0271664 | A1 | 11/2011 | Boorse et al. |
| 2011/0295484 | A1 | 12/2011 | L'Henoret |
| 2011/0313635 | A1 | 12/2011 | Blanc et al. |
| 2012/0117954 | A1 | 5/2012 | Yasui et al. |
| 2012/0255286 | A1 | 10/2012 | Matsunaga et al. |
| 2013/0078173 | A1 | 3/2013 | Cox |
| 2013/0116881 | A1 | 5/2013 | Bogema et al. |
| 2013/0232958 | A1 | 9/2013 | Ancimer et al. |
| 2013/0289857 | A1 | 10/2013 | Schmitt et al. |
| 2013/0318949 | A1 | 12/2013 | Matsunaga et al. |
| 2014/0052353 | A1 | 2/2014 | Sujan et al. |
| 2014/0056789 | A1 | 2/2014 | Mussmann et al. |
| 2014/0229010 | A1 | 8/2014 | Farquharson et al. |
| 2015/0020506 | A1 | 1/2015 | Johansen |
| 2015/0023853 | A1 | 1/2015 | Wittrock et al. |
| 2015/0033715 | A1 | 2/2015 | Markatou et al. |
| 2015/0131093 | A1 | 5/2015 | Saptari |
| 2015/0143798 | A1 | 5/2015 | Lee |
| 2015/0204226 | A1 | 7/2015 | Moore |
| 2015/0231564 | A1 | 8/2015 | Wittrock et al. |
| 2015/0231565 | A1 | 8/2015 | Wittrock et al. |
| 2015/0337702 | A1 | 11/2015 | Ettireddy et al. |
| 2016/0201533 | A1 | 7/2016 | Upadhyay et al. |
| 2016/0367941 | A1 * | 12/2016 | Gilbert ............... B01D 53/9418 |

FOREIGN PATENT DOCUMENTS

| | | |
|---|---|---|
| DE | 3733501 A1 | 4/1989 |
| DE | 102006031650 A1 | 1/2008 |
| DE | 102008026191 A1 | 1/2009 |
| DE | 102009049521 A1 | 7/2010 |
| DE | 102009038835 A1 | 3/2011 |
| DE | 102010050312 A1 | 5/2012 |
| DE | 102012201809 A1 | 9/2012 |
| DE | 102014019427 A1 | 8/2015 |
| DE | 102015015260 A1 | 6/2017 |
| EP | 1181531 A1 | 2/2002 |
| EP | 2390480 A1 | 11/2011 |
| FR | 2919339 A1 | 1/2009 |
| FR | 2956039 A1 | 8/2011 |
| JP | 2006009606 A | 1/2009 |
| JP | 2009041454 A | 2/2009 |
| JP | 2010096039 A | 4/2010 |
| JP | 2010185369 A | 8/2010 |
| JP | 2013002283 A | 1/2013 |
| JP | 2013104346 A | 5/2013 |
| JP | 2015137583 A | 7/2015 |
| JP | 2015137583 A * | 7/2015 |
| KR | 20140143145 | 12/2014 |
| WO | 2006008625 A1 | 1/2006 |
| WO | 2007104382 A1 | 9/2007 |
| WO | 2007145548 A1 | 12/2007 |
| WO | 2009017597 A1 | 2/2009 |
| WO | 2009017639 A1 | 2/2009 |
| WO | 2011102781 A1 | 8/2011 |
| WO | 2011133092 A1 | 10/2011 |
| WO | 2012037342 A1 | 3/2012 |
| WO | 2013022516 A1 | 2/2013 |
| WO | 2013095214 A1 | 6/2013 |
| WO | 2013100846 A1 | 7/2013 |
| WO | 2014014399 A1 | 1/2014 |
| WO | 2014016616 A1 | 1/2014 |
| WO | 2014044318 A1 | 3/2014 |
| WO | 2014060987 A1 | 4/2014 |
| WO | 2014149297 A1 | 9/2014 |

OTHER PUBLICATIONS

Scania CV AB, International Application No. PCT/SE2016/050796, International Preliminary Report on Patentability, dated Feb. 27, 2018.

(56) References Cited

OTHER PUBLICATIONS

Scania CV AB, Japanese Application No. 2018-510514, Office Action, dated Apr. 9, 2019.
Scania CV AB, Korean Application No. 10-2018-7007504, Office Action, dated May 27, 2019.
Botar-Jid, Claudiu Cristian (2007)—Selective catalytic reduction of nitrogen oxides with ammonia in forced unsteady state reactors—Case based reasoning and mathematical model simulation reasoning; Retrieved online from http://urn.fi/URN:ISBN:978-952-214-469-0; p. 3, second paragraph.
NOx Controls; EPA/452/B-02-001 Section 4—Retrieved online on Jun. 5, 2015 from http://www.epa.gov/ttncatcl/dirl/cs4-2ch2.pdf; pp. 2-6, third paragraph.
International Search Report for PCT/SE2016/050796 dated Nov. 15, 2016.
Written Opinion of the International Searching Authority for PCT/SE2016/050796 dated Nov. 22, 2016.
European Search Report for European Patent Application No. EP16839707 dated Jan. 4, 2019.
Supplementary European Search Report for European Patent Application No. EP16839707 dated Dec. 14, 2018.
Scania CV AB, Chinese Application No. 201680047426.X, First Office Action, dated Jul. 29, 2019.
Scania CV AB, European Application No. 168397073, Communication pursuant to Article 94(3) EPC, dated Mar. 24, 2020.
Scania CV AB, Swedish Application No. 1551109-0, Office Action, dated Apr. 15, 2016.

\* cited by examiner

EXHAUST TREATMENT SYSTEM AND METHOD FOR TREATMENT OF AN EXHAUST GAS STREAM

CROSS-REFERENCE TO RELATED APPLICATION(S)

This application is a national stage application (filed under 35 § U.S.C. 371) of PCT/SE2016/050796, filed Aug. 25, 2016 of the same title, which, in turn claims priority to Swedish Application No. 1551109-0, filed Aug. 27, 2015 of the same title; the contents of each of which are hereby incorporated by reference.

FIELD OF THE INVENTION

The present invention relates to an exhaust treatment system, a method, and computer program product for treatment of an exhaust.

BACKGROUND OF THE INVENTION

The following background description constitutes a description of the background to the present invention, and thus need not necessarily constitute prior art.

In connection with increased government interests concerning pollution and air quality, primarily in urban areas, emission standards and regulations regarding emissions from combustion engines have been drafted in many jurisdictions.

Such emission standards often consist of requirements defining acceptable limits of exhaust emissions from combustion engines in for example vehicles. For example, emission levels of nitrogen oxides $NO_x$, hydrocarbons $C_xH_y$, carbon monoxide CO and particles PM are often regulated by such standards for most types of vehicles. Vehicles equipped with combustion engines typically give rise to such emissions in varying degrees. In this document, the invention will be described mainly for its application in vehicles. However, the invention may be used in substantially all applications where combustion engines are used, for example in vessels such as ships or aeroplanes/helicopters, wherein regulations and/or standards for such applications limit emissions from the combustion engines.

In an effort to comply with these emission standards, the exhausts caused by the combustion of the combustion engine are treated (purified).

A common way of treating exhausts from a combustion engine consists of a so-called catalytic purification process, which is why vehicles equipped with a combustion engine usually comprise at least one catalyst. There are different types of catalysts, where the different respective types may be suitable depending on for example the combustion concept, combustion strategies and/or fuel types which are used in the vehicles, and/or the types of compounds in the exhaust stream to be purified. In relation to at least nitrous gases (nitrogen monoxide, nitrogen dioxide), referred to below as nitrogen oxides $NO_x$, vehicles often comprise a catalyst, wherein an additive is supplied to the exhaust stream resulting from the combustion in the combustion engine, in order to reduce nitrogen oxides $NO_x$, primarily to nitrogen gas and aqueous vapor. This is described in more detail below.

SCR (Selective Catalytic Reduction) catalysts are a commonly used type of catalyst for this type of reduction, primarily for heavy goods vehicles. SCR catalysts usually use ammonia $NH_3$, or a composition from which ammonia may be generated/formed, as an additive to reduce the amount of nitrogen oxides $NO_x$ in the exhausts. The additive is injected into the exhaust stream resulting from the combustion engine upstream of the catalyst. The additive added to the catalyst is adsorbed (stored) in the catalyst, in the form of ammonia $NH_3$, so that a redox-reaction may occur between nitrogen oxides $NO_x$ in the exhausts and ammonia $NH_3$ available via the additive.

A modern combustion engine is a system where there is cooperation and mutual impact between the engine and the exhaust treatment. Specifically, there is a correlation between the exhaust treatment system's ability to reduce nitrogen oxides $NO_x$ and the fuel efficiency of the combustion engine. For the combustion engine, there is a correlation between the engine's fuel efficiency/total efficiency and the nitrogen oxides $NO_x$ produced by it. This correlation specifies that for a given system there is a positive connection between nitrogen oxides $NO_x$ produced and fuel efficiency, in other words an engine that is permitted to emit more nitrogen oxides $NO_x$ may be induced to consume less fuel by way of, for example, a more optimal selection of the injection timing, which may yield a higher combustion efficiency. Similarly, there is often a negative correlation between a produced particle mass PM and the fuel efficiency, meaning that an increased emission of particle mass PM from the engine is connected with an increased fuel consumption. This correlation is the background to the widespread use of exhaust treatment systems comprising an SCR-catalyst, where the intention is the optimization of the engine regarding fuel consumption and emission of particles, towards a relatively larger amount of nitrogen oxides $NO_x$ produced. A reduction of these nitrogen oxides $NO_x$ is then carried out in the exhaust treatment system, which thus may comprise an SCR-catalyst. Through an integrated approach in the design of the engine and exhaust treatment system, where the engine and exhaust treatment complement each other, a high fuel efficiency may therefore be achieved jointly with low emissions of both particles PM as well as nitrogen oxides $NO_x$.

BRIEF DESCRIPTION OF THE INVENTION

To some extent, the performance of the exhaust treatment system may be enhanced by increasing the substrate volumes comprised in the exhaust treatment system, which in particular reduces losses due to uneven distribution of the exhaust flow through the substrate. At the same time, a larger substrate volume provides a greater back pressure, which may counteract gains in fuel efficiency due to the higher conversion degree. Larger substrate volumes also entail an increased cost. It is thus important to be able to use the exhaust treatment system optimally, for example by avoiding over-sizing and/or by limiting the exhaust treatment system's spread in terms of size and/or manufacturing cost.

The function and efficiency for catalysts in general, and for reduction catalysts in particular, is strongly dependent on the temperature over the reduction catalyst. The term "temperature over the reduction catalyst" as used herein, means the temperature in/at/for the exhaust stream through the reduction catalyst. The substrate will assume this temperature due to its heat exchanging ability. At a low temperature over the reduction catalyst, the reduction of nitrogen oxides $NO_x$ is typically ineffective. The $NO_2/NO_x$ fraction in the exhausts provides a certain potential for increasing the catalytic activity, also at lower exhaust temperatures. The temperature and the $NO_2/NO_x$ fraction over the reduction catalyst are, however, generally difficult to control, since they to a great extent depend on a number of factors, such as how the driver drives the vehicle. For example, the temperature over the reduction catalyst depends on the torque requested by a driver and/or by a cruise control, on the appearance of the road section in which the vehicle is located, and/or the driving style of the driver.

Prior art exhaust treatment systems, such as the system described in detail below, which many producers have used to meet the emission standard Euro VI (hereafter referred to as the "Euro VI-system"), comprising an oxidation catalyst, a diesel particulate filter and a reduction catalyst, have problems relating to the large thermal mass/inertia of the catalysts/filters and the large thermal mass/inertia of the rest of the exhaust treatment system, comprising for example exhaust pipes, silencers and various connections. At for example cold starts, where both the engine and the exhaust treatment system are cold, and at increased power output from low exhaust temperatures, where more torque than previously is requested, for example when easy city driving turns into highway driving, or after idling and power take-off, it is primarily the diesel particulate filter's large thermal mass/inertia that causes the temperature of the reduction catalyst to increase only slowly in such prior art exhaust treatment systems. Thus, at for example cold starts and at vehicle operation with temperature- and/or flow transient elements, the function of the reduction catalyst deteriorates, and accordingly the reduction of nitrogen oxides $NO_x$ also deteriorates. This deterioration may result in a poor exhaust purification, risking unnecessary pollution of the environment. Additionally, because of the deterioration of the reduction catalyst's function, the risk of not achieving the regulatory requirements relating to exhaust purification increases. Fuel consumption may also be adversely impacted by the deteriorating function, since fuel energy may then need to be used in order to increase the temperature and efficiency of the reduction catalyst, via different temperature increasing measures.

One objective of the present invention is to improve the purification of exhausts in an exhaust treatment system, while improving the conditions for achieving a higher fuel efficiency.

According to the present invention, an exhaust treatment system is provided, arranged for the treatment of an exhaust stream from a combustion engine. The exhaust treatment system comprises a first reduction catalyst device, arranged for reduction of nitrogen oxides $NO_x$ in the exhaust stream, through the use of compounds comprising one or several of carbon monoxide CO and hydrocarbons HC, which are comprised in the exhaust stream when the exhaust stream reaches the first reduction catalyst device. In this document, the term hydrocarbons HC is generally used for hydrocarbon compounds $C_aH_b$, which comprise compounds comprising carbon C and hydrogen H in different proportions. Thus, the first reduction of nitrogen oxides $NO_x$ according to the present invention is carried out based on compounds, which occur naturally or are created in/introduced into the exhaust stream from the engine. Accordingly, the need for supply of additives comprising ammonia upstream of the first reduction catalyst device is eliminated according to some embodiments of the present invention. This may also be described as the possibility that the first reduction of nitrogen oxides $NO_x$ in the first reduction catalyst device may be solely exhaust based, wherein nitrogen oxides $NO_x$ in the exhausts are reduced with the use of compounds occurring naturally or being created in the exhausts already at the combustion engine.

The exhaust treatment system also comprises a particulate filter, which is arranged downstream of the first reduction catalyst device to catch and oxidize soot particles in the exhaust stream.

The exhaust treatment system comprises a second dosage device arranged downstream of the particulate filter, to supply an additive comprising ammonia or a substance from which ammonia may be extracted and/or released into the exhaust stream.

The exhaust treatment system also comprises a second reduction catalyst device arranged downstream of the second dosage device, for reduction of nitrogen oxides $NO_x$ in the exhaust stream with the use of the additive supplied by the second dosage device.

With the use of the present invention compounds occurring naturally or being created in/introduced into the exhaust stream may thus be used at the reduction of nitrogen oxides $NO_x$ with the first reduction catalyst device. Thus, according to several embodiments the requirement relating to a first dosage device for dosage of additive, such as ammonia or AdBlue, being fitted upstream of the first reduction catalyst device is eliminated, which reduces the manufacturing costs and service costs of the vehicle. Additionally, the technical complexity of the exhaust treatment system is reduced, since no evaporation and/or mixture of additive is required upstream of the first reduction catalyst device. In other words, when several embodiments of the present invention are used, no first dosage device nor are any devices supplying additive to the first dosage device are required. The exhaust treatment system does not need to comprise a first evaporation device or a first mixer upstream of the first reduction catalyst device. Additionally, the operating cost of the vehicle is reduced since the consumption of additive, such as AdBlue or an equivalent, is reduced, as the first reduction is performed with the first reduction catalyst with compounds occurring in the exhaust stream instead of with additives.

Further, the reduction of nitrogen oxides $NO_x$ according to the present invention may continue even if the additive runs out, since the reduction may be performed based on compounds occurring in the exhaust stream from the engine.

Through the use of the present invention a more temperature efficient treatment of the exhausts is also achieved, since the first reduction catalyst device fitted upstream in the exhaust treatment system according to the invention may, in some operating modes, operate at more favorable temperatures than the temperatures of the second reduction catalyst device fitted downstream. For example, at cold starts and increased power output from low temperatures, the first reduction catalyst device sooner reaches operating temperatures, at which an efficient reduction of nitrogen oxides $NO_x$ is obtained. Thus, according to the invention the available heat is used in a more energy efficient manner, resulting in an earlier and/or more efficient reduction of nitrogen oxides $NO_x$, for example at cold starts and at increased power output from low exhaust temperatures, than what would have been possible with the above described prior art exhaust treatment systems.

At certain other operating modes, similarly, the second reduction catalyst device fitted downstream may operate at more favorable temperatures than the temperatures of the first reduction catalyst device fitted upstream.

Through the use of the invention different thermal inertias are obtained for the first and the second reduction catalyst device, meaning that these first and second reduction catalyst devices may be optimized differently with respect to activity and selectivity. Thus, the first and second reduction catalyst devices may be optimized from a system perspective, that is to say from a perspective relating to the entire exhaust treatment system's function, and may therefore be used to provide an overall more efficient purification of the exhausts than what the separately optimized catalysts would have been able to provide. Such optimization of the first and second reduction catalyst devices according to the invention may be used to provide this overall more efficient purification at for example cold start, but also at substantially all vehicle operation, since the temperature- and/or flow transient elements often occur also at normal vehicle operation. As mentioned above, the invention may also be used for exhaust purification in other units than vehicles, such as in different types of vessels, where an overall more efficient purification of the exhausts from the unit is obtained.

The present invention uses the thermal inertia/mass of the particulate filter to the function's advantage, by optimizing the function for both the first and the second reduction catalyst devices, based on this inertia. Accordingly, through the present invention a cooperation/symbiosis is obtained between the first reduction catalyst device, which is optimized for the first thermal mass and the first temperature function/temperature process to which it is exposed, and the second reduction catalyst device, which is optimized for the second thermal mass and the second temperature process to which it is exposed.

The first reduction catalyst device and/or the second reduction catalyst device may thus be optimized based on characteristics, for example catalytic characteristics, for the second reduction catalyst device and/or the first reduction catalyst device. For example, the second reduction catalyst device may be construed/selected so that its catalytic characteristics at low temperatures become less efficient, facilitating that its catalytic characteristics at high temperatures may be optimized. If regard is had to these catalytic characteristics of the second reduction catalyst device, the first reduction catalyst device's catalytic characteristics may then be optimized in such a way that it need not be as efficient at high temperatures.

These possibilities of optimizing the first reduction catalyst device and/or the second reduction catalyst device mean that the present invention provides an exhaust purification which is suitable for emissions arising at substantially all types of driving modes, especially for highly transient operation, which results in a variable temperature- and/or flow profile. Transient operation may for example comprise relatively many starts and brakes of the vehicle, or relatively many uphill and downhill slopes. Since relatively many vehicles, such as for example buses that often stop at bus stops, and/or vehicles driven in urban traffic or hilly topography, experience such transient operation, the present invention provides an important and very useful exhaust purification, which overall reduces the emissions from the vehicles in which it is implemented.

The present invention thus uses the previously problematic thermal mass and heat exchange in, primarily, the particulate filter in the Euro VI-system as a positive characteristic. The exhaust treatment system according to the present invention may, similarly to the Euro VI-system, contribute heat to the exhaust stream and the reduction catalyst device fitted downstream for brief dragging periods, or other low temperature operation, if such low temperature operation was preceded by operation with higher operating temperatures. Due to its thermal inertia, the particulate filter at this point is warmer than the exhaust stream, and accordingly the exhaust stream may be heated by the particulate filter.

Additionally, this good characteristic is complemented by the fact that the reduction catalyst device placed upstream may, especially at transient operation, use the higher temperature arising in connection with increased power output. Thus, the first reduction catalyst device experiences a higher temperature after the increased power output, than what the second reduction catalyst device experiences. Such higher temperature for the first reduction catalyst device is used by the present invention in order to improve the $NO_x$-reduction of the first reduction catalyst device. The present invention, which uses two reduction catalyst devices, may use both these positive characteristics by adding a possibility for $NO_x$-reduction with a small thermal inertia, that is to say the exhaust treatment system according to the invention comprises both a $NO_x$-conversion upstream of a large thermal inertia, and a $NO_x$-conversion downstream of a large thermal inertia. The exhaust treatment system according to the present invention may then, in an energy efficient manner, use available heat to a maximum, meaning that the rapid and "unfiltered" heat experienced by the reduction catalyst device placed upstream may also be used to make the exhaust treatment system according to the invention efficient.

The exhaust treatment system according to the present invention has potential to meet the emission requirements in the Euro VI emission standard. Additionally, the exhaust treatment system according to the present invention has potential to meet the emission requirements in several other existing and/or future emission standards.

The exhaust treatment system according to the present invention may be made compact, since it comprises, in relation to the performance/purification degree which it may deliver, few units in the exhaust treatment system. These relatively few units need not, for a balanced exhaust treatment system according to the present invention, have a large volume. Since the number of units, and the size of these units, is minimized by the present invention, the exhaust back pressure may also be limited, which entails a lower fuel consumption for the vehicle. To obtain a certain catalytic purification, catalytic performance per substrate volume unit may be exchanged for a smaller substrate volume. For an exhaust purification device with a predetermined size, and/or a predetermined external geometry, which is often the case in vehicles with limited space for the exhaust treatment system, a smaller substrate volume means that a larger volume within the predetermined size of the exhaust purification may be used for distribution, mixture and turnings of the exhaust stream within the exhaust purification device. This means that the exhaust back pressure may be reduced for an exhaust purification device with a predetermined size and/or a predetermined external geometry, if the performance per substrate volume unit is increased. Thus, the total volume of the exhaust treatment system according to the invention may be reduced, compared with at least some prior art systems. Alternatively, the exhaust back pressure may be reduced with the use of the present invention.

At the use of the present invention, the need for an exhaust gas recirculation system (Exhaust Gas Recirculation; EGR) may also be reduced or eliminated. A reduction of the need to use an exhaust gas recirculation system has advantages, among others relating to robustness, gas exchange complexity and power output.

At new production of vehicles, the system according to the present invention may be fitted easily at a limited cost, since the separate oxidation catalyst DOC, that is to say the separate substrate for the oxidation catalyst DOC, and the installation of such substrate, which existed in prior art systems, is exchanged for the first reduction catalyst device according to the present invention at manufacture. Retrofitting of an exhaust treatment system according to the present invention may also be carried out easily, since the oxidation catalyst DOC, which was present in prior art systems, may also be replaced with the first reduction catalyst device according to the present invention in already produced vehicles. Since compounds comprising carbon monoxide CO and/or hydrocarbons HC, which occur naturally or are created in/introduced into the exhaust stream, are used in the reduction of nitrogen oxides $NO_x$ according to the present invention, no additional dosage device will be required. To achieve a sufficient nitrogen oxide based ($NO_2$-based) soot oxidation, the engine's ratio between nitrogen oxides and soot ($NO_x$/soot-ratio) may according to some embodiments of the present invention need to fulfil certain criteria.

According to one embodiment of the present invention, the particulate filter consists of a traditional non-coated particulate filter.

According to another embodiment of the present invention, the oxidizing coating, for example comprising precious metal, which in Euro VI-systems is located in the oxidation catalyst DOC, may instead at least partly be implemented in the diesel particulate filter cDPF, whereat conditions for a sufficient $NO_2$-based soot oxidation may be obtained. Thus, a compact design of the exhaust treatment system according to the invention is obtained. Through the use of a diesel particulate filter cDPF with oxidation catalyst characteristics, an increased predictability for the formation of nitrogen dioxides $NO_2$ may also be obtained. This is due to the fact that deactivation of the catalytically active seats, such as for example deactivation caused by phosphorus, often has an axial concentration gradient. This means that catalysts with a relatively brief physical length may be more sensitive to these intoxications, than catalysts with a larger physical length. Where for example precious metal, such as platinum, is placed on the physically long diesel particulate filter cDPF, instead of on the physically shorter oxidation catalyst DOC, more stable levels of nitrogen dioxide $NO_2$ may potentially be obtained over time.

According to one embodiment of the present invention, the particulate filter comprises at least partly a catalytically reducing coating arranged for reduction of nitrogen oxides $NO_x$.

According to one embodiment of the present invention, the first reduction catalyst device constitutes an, at least partly, protective substrate upstream of an oxidizing coating, wherein the oxidizing coating may be comprised in an oxidation catalyst or in a particulate filter, coated with for example a precious metal. The catalytic coating for the first reduction catalyst device may, according to one embodiment, be selected to be robust in withstanding chemical poisoning, which may, over time, provide a more stable level for the ratio between nitrogen dioxide and nitrogen oxides $NO_2/NO_x$ reaching the second reduction catalyst device.

Additionally, an adaptation/calibration of several $NO_x$-sensors in the exhaust treatment system may easily be carried out in the system according to the present invention, since the sensors may be subjected to the same $NO_x$-level, at the same time as the emission levels may be kept at reasonable levels during the adaptation/calibration. For the Euro VI-system, for example, the adaptation/calibration often entails that the emissions become too high during, and also partly after, the adaptation/calibration itself.

As mentioned above, the first and second reduction catalyst devices may be optimized individually, and with consideration of the entire exhaust treatment system's function, which may result in an overall very efficient purification of the exhausts. This individual optimization may also be used to reduce one or several of the volumes taken up by the first and second reduction catalyst devices, so that a compact exhaust treatment system is obtained.

The present invention also facilitates, according to one embodiment, control of a ratio $NO_{2\_2}/N_{x\_2}$, between the amount of nitrogen dioxide $NO_{2\_2}$ and the amount of nitrogen oxides $NO_{x\_2}$ for the second reduction step, which means that the system may avoid excessively high values for this ratio, for example avoiding $NO_{2\_2}/NO_{x\_2} > 50\%$, and that the system, by increasing the dosage, may increase the value for the ratio $NO_{2\_2}/NO_{x\_2}$ when the value is too low, for example if $NO_{2\_2}/NO_{x\_2} < 50\%$. The value for the ratio $NO_{2\_2}/NO_{x\_2}$ may here, for example through the use of an embodiment of the present invention, be increased by reducing the level of nitrogen oxides $NO_{x\_2}$. The ratio $NO_{2\_2}/NO_{x\_2}$ may assume lower values, for example, after the system has aged for some time. The present invention thus provides for a possibility to counteract this characteristic, which deteriorates over time and is negative to the system, resulting in values which are too low for the ratio $NO_{2\_2}/NO_{x\_2}$. Through the use of the present invention, the level of nitrogen dioxide $NO_{2\_2}$ may thus be controlled actively, which is made possible by that the $NO_{x\_2}$-level may be adjusted upstream of the catalytically oxidizing coating, for example containing precious metal, in the oxidation catalyst or in the particulate filter. This control of the ratio $NO_{2\_2}/NO_{x\_2}$ may, apart from advantages in catalytic performance, such as higher $NO_x$-conversion, also result in a possibility of specifically reducing emissions of nitrogen dioxide $NO_2$, which result in a very poisonous and strong smelling emission. This may result in advantages at a potential future introduction of a separate regulatory requirement relating to nitrogen dioxide $NO_2$, and facilitate a reduction of harmful emissions of nitrogen dioxide $NO_2$. This may be compared with, for example, the Euro VI-system, in which the fraction of nitrogen dioxide $NO_2$ provided at the exhaust purification may not be impacted in the exhaust treatment system itself.

In other words, the active control of the level of nitrogen dioxide $NO_{2\_2}$ is facilitated at the use of the present invention, where the active control may be used to increase the level of nitrogen dioxide $NO_{2\_2}$ in driving modes for which this is necessary. Accordingly, an exhaust treatment system may be selected/specified, which requires less precious metal and thus also is cheaper to manufacture.

Of the total conversion of nitrogen oxides $NO_x$, if the fraction occurring via a rapid reaction path—that is to say via a fast SCR, wherein the reduction occurs via reaction paths over both nitrogen oxide NO and nitrogen dioxide $NO_2$—may be increased through active control of the level of nitrogen dioxide $NO_{2\_2}$, then the catalyst volume requirement described above may also be reduced.

According to one embodiment of the present invention, the first reduction catalyst device in the exhaust treatment system is active at a lower reduction temperature interval $T_{red}$ than the oxidation temperature interval $T_{ox}$, which is required for the nitrogen dioxide based soot oxidation in the particulate filter DPF. As an example, the nitrogen dioxide based soot oxidation in the particulate filter DPF may occur at temperatures exceeding 275° C. Hereby, the reduction of nitrogen oxides $NO_x$ in the first reduction catalyst device does not significantly compete with the soot oxidation in the particulate filter DPF, since they are active within at least partly different temperature intervals $T_{red} \neq T_{ox}$. For example, a well selected and optimized first reduction catalyst device may result in a significant conversion of nitrogen oxides $NO_x$ also at approximately 200° C., which means that this first reduction catalyst device does not need to compete with the particulate filter's soot oxidation performance, so that an efficient soot oxidation is achieved.

Further, with the use of the present invention, secondary emissions such as emissions of ammonia $NH_3$ and/or nitrous oxide (laughing gas) $N_2O$ may be reduced in relation to a given conversion level, and/or a given $NO_x$-level. A catalyst, for example an SC (Slip Catalyst), which may be comprised in the second reduction step if the emissions for certain jurisdictions must be reduced to very low levels, may have a certain selectivity against, for example, nitrous oxide $N_2O$, which means that the reduction of the $NO_x$-level through the use of the additional reduction step according to the present invention also shifts the resulting levels for nitrous oxide $N_2O$ downwards. The resulting levels of ammonia $NH_3$ may be shifted downwards in a similar manner when the present invention is used.

Through the use of the present invention a better fuel optimization may be obtained for the vehicle, since there is thus potential to control the engine in a more fuel efficient manner, so that a higher efficiency for the engine is obtained. Thus, a performance gain and/or a reduced emission of carbon dioxide $CO_2$ may be obtained when the present invention is used.

BRIEF DISCUSSION OF THE DRAWINGS

The invention will be illustrated in more detail below, along with the enclosed drawings, where similar references are used for similar parts, and where:

Figure 3A:
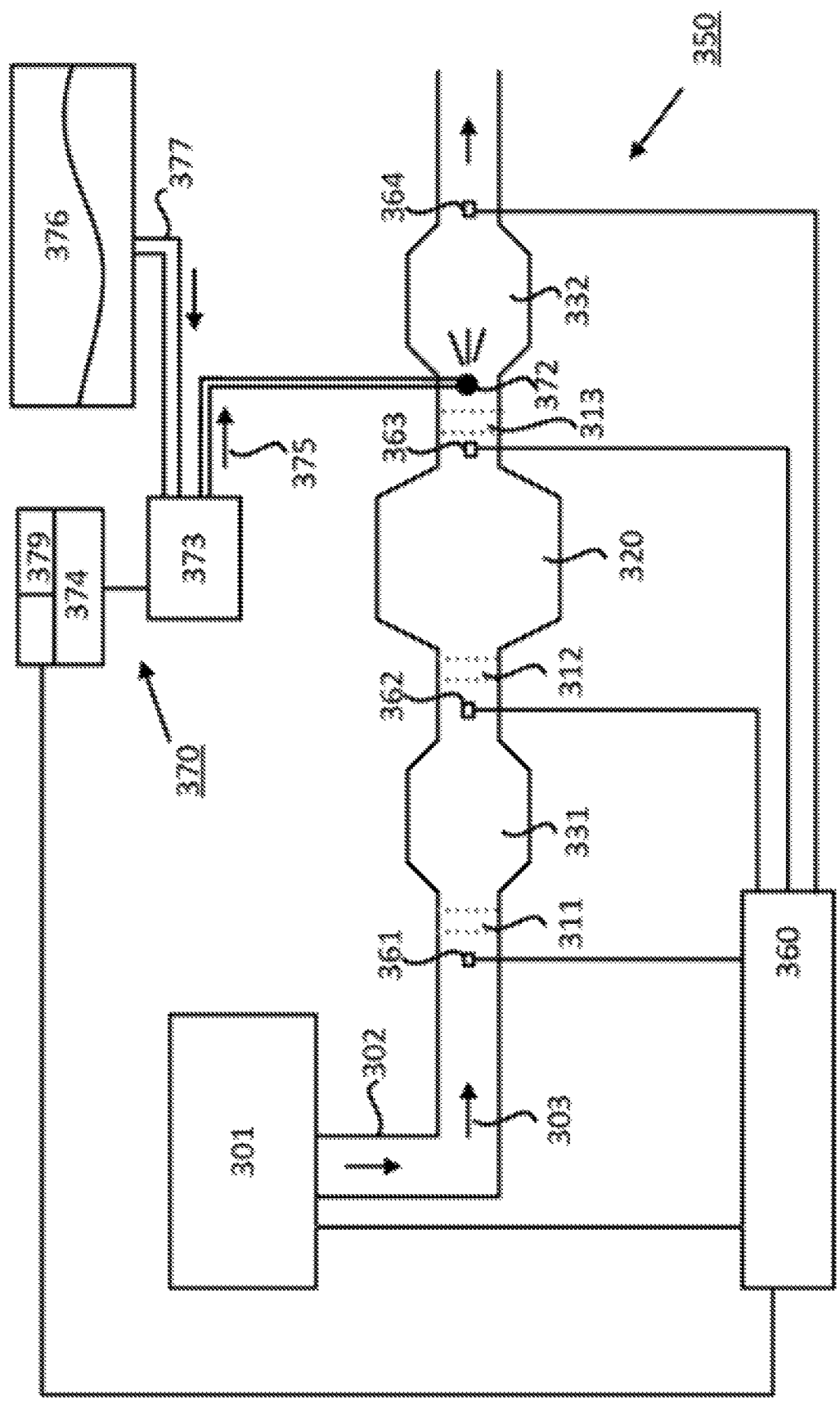
Figure 3B:
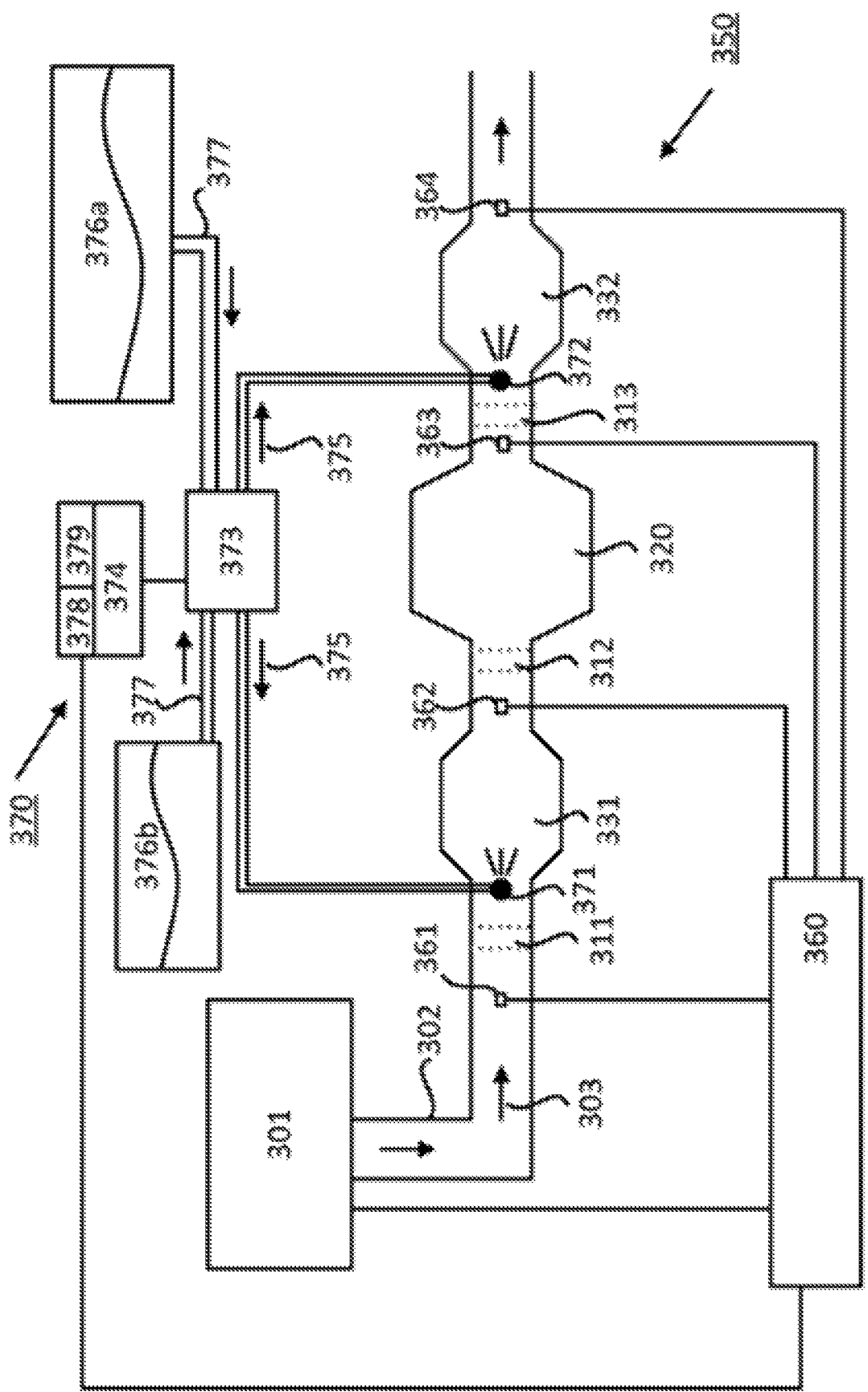
Figure 4:
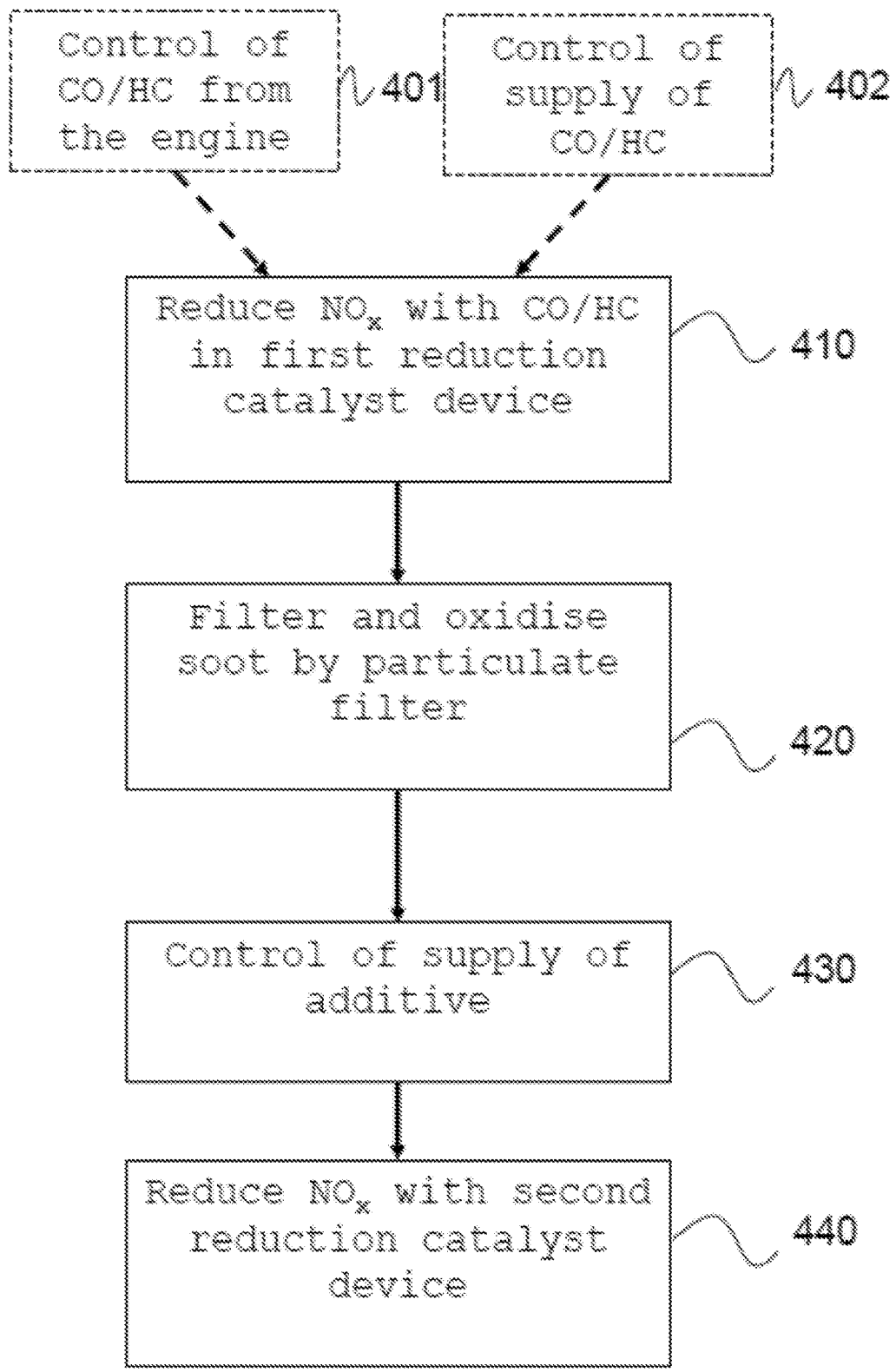
Figure 5:
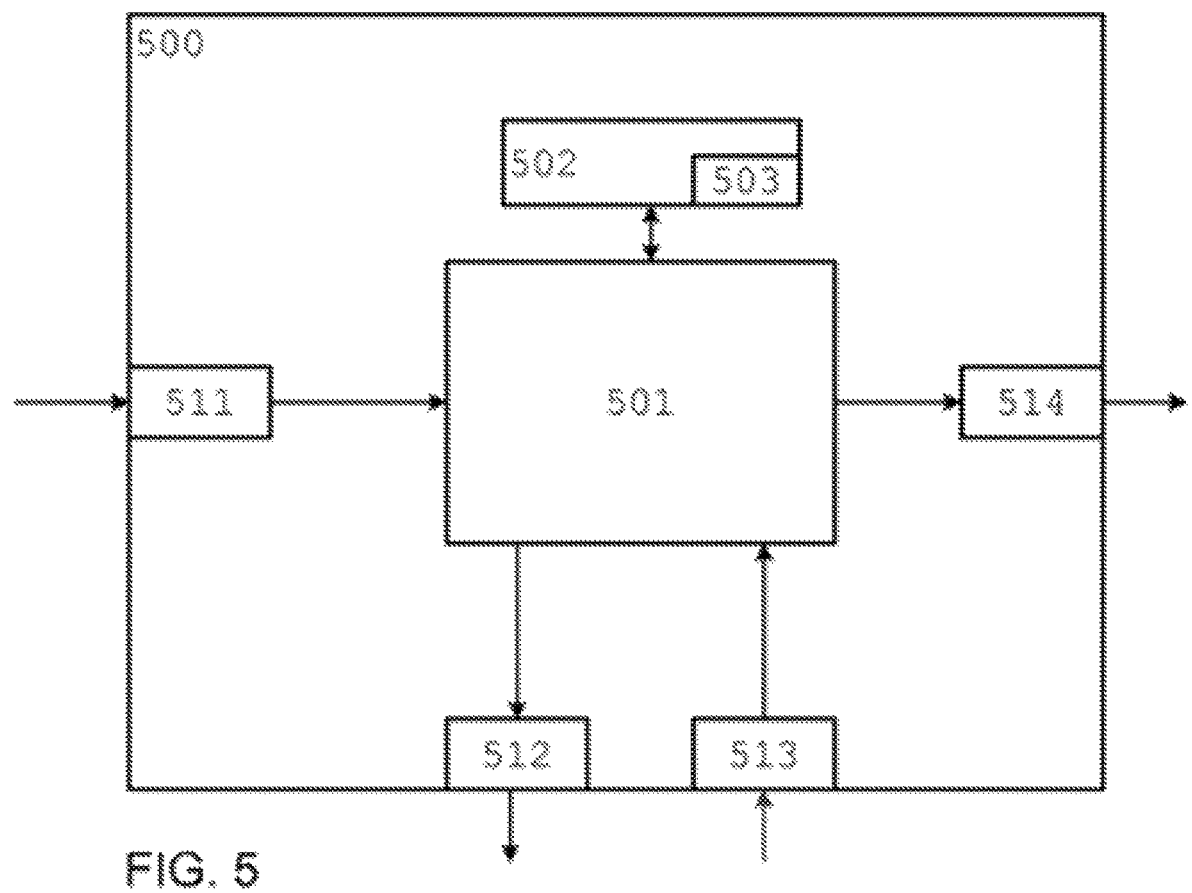
Figure 6:
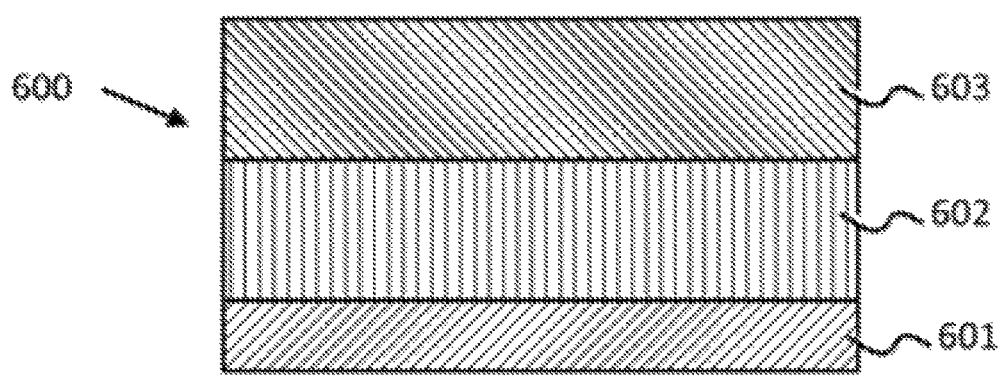

FIGS. 3a-b show an exhaust treatment system according to different embodiments of the present invention, FIG. 4 shows a flow chart for the method for exhaust treatment according to the present invention, FIG. 5 shows a control device according to the present invention, and FIG. 6 schematically shows a multifunctional slip-catalyst.

DETAILED DESCRIPTION OF THE INVENTION

Figure 1:
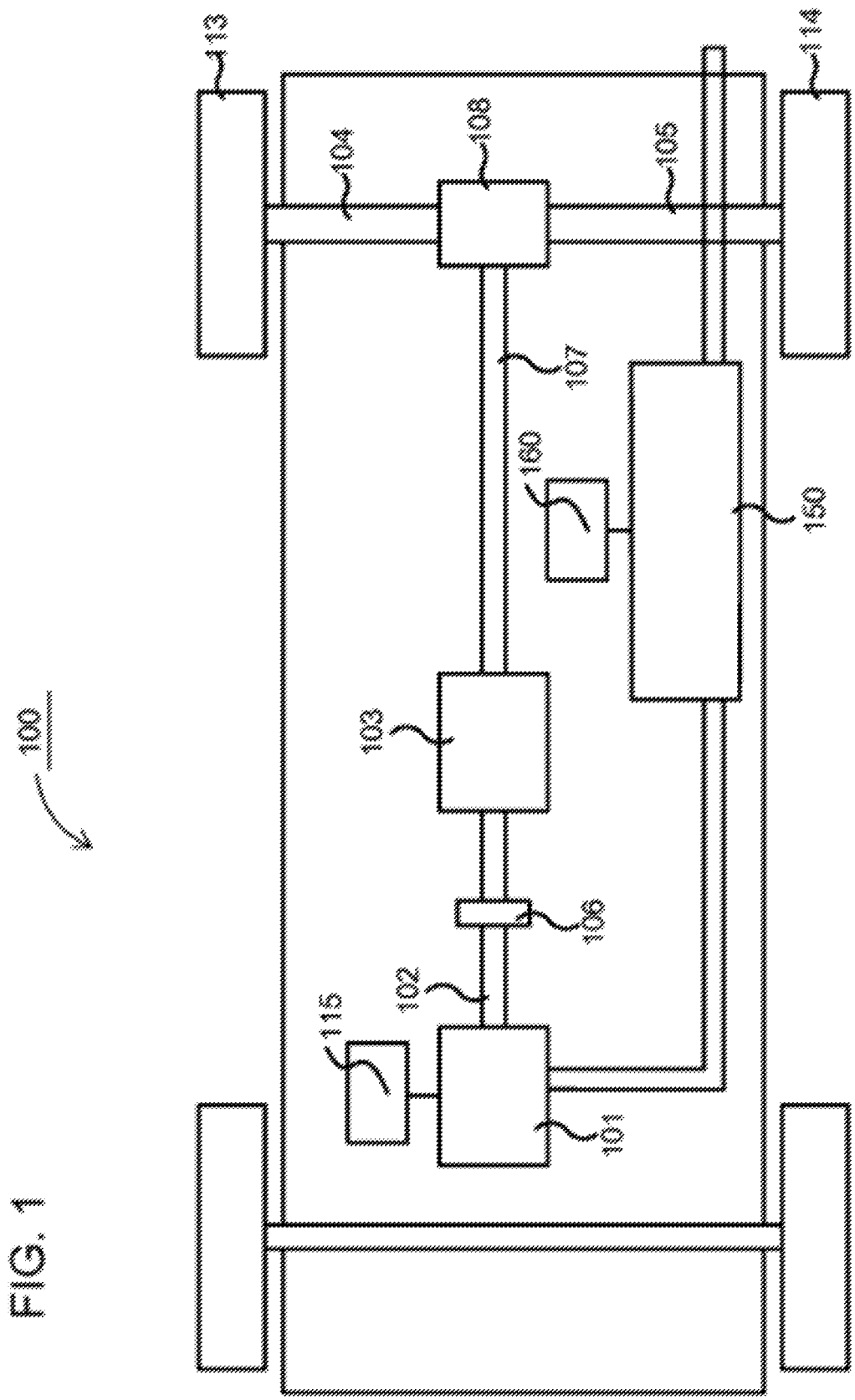
FIG. 1 shows an example vehicle which may comprise the present invention.

FIG. 1 schematically shows an example vehicle 100 comprising an exhaust treatment system 150, which may be an exhaust treatment system 150 according to one embodiment of the present invention. The power-train comprises a combustion engine 101, which in a customary manner, via an output shaft 102 on the combustion engine 101, usually via a flywheel, is connected to a gearbox 103 via a clutch 106.

The combustion engine 101 is controlled by the engine's control system via a control device 115. Likewise, the clutch 106 and the gearbox 103 may be controlled by the vehicle's control system, with the help of one or more applicable control devices (not shown). The vehicle's power-train may also be of another type, such as a type with a conventional automatic gearbox, of a type with a hybrid power-train, etc.

An output shaft 107 from the gearbox 103 drives the wheels 113, 114 via a final drive 108, such as e.g. a customary differential, and the drive shafts 104, 105 connected to said final drive 108.

The vehicle 100 also comprises an exhaust treatment system/exhaust purification system 150 for treatment/purification of exhaust emissions resulting from combustion in the combustion chambers, which may consist of cylinders, of the combustion engine 101.

Figure 2:
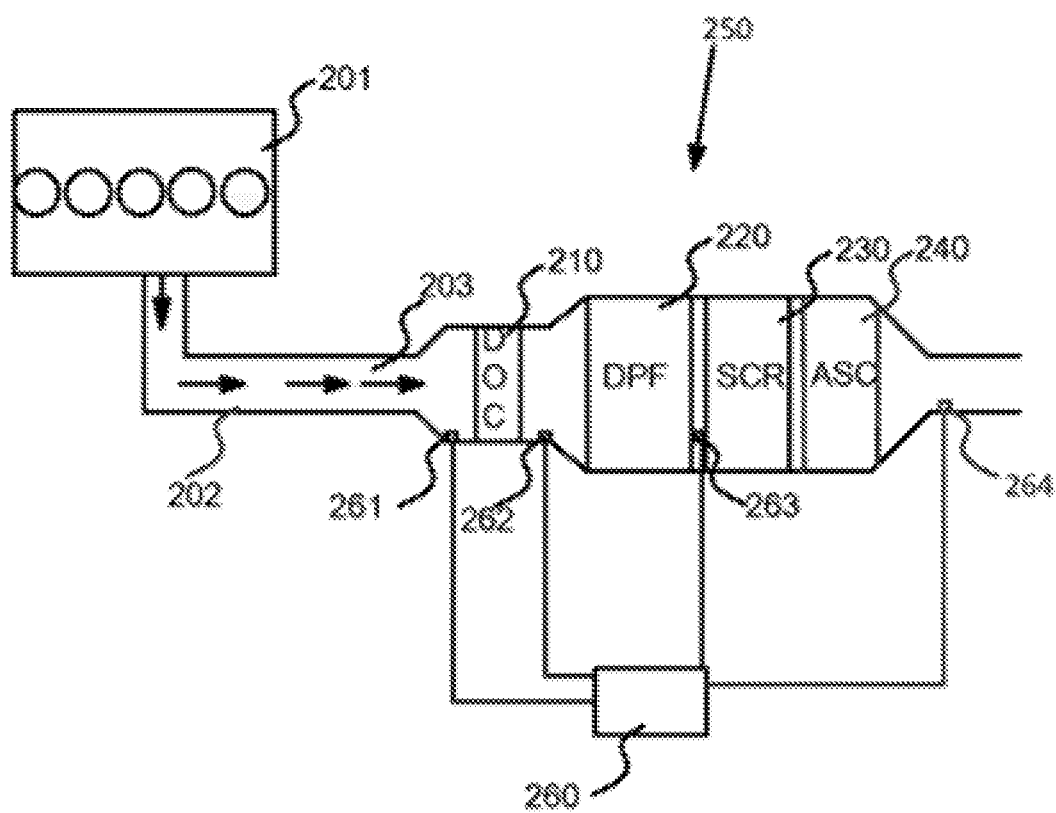
FIG. 2 shows a traditional exhaust treatment system.

FIG. 2 shows a prior art exhaust treatment system 250, which may illustrate the above mentioned Euro VI-system, and which is connected to a combustion engine 201 via an exhaust conduit 202, wherein the exhausts generated at combustion, that is to say the exhaust stream 203, is indicated with arrows. The exhaust stream 203 is led to a diesel particulate filter (DPF) 220, via a diesel oxidation catalyst (DOC) 210. During the combustion in the combustion engine, soot particles are formed, and the particulate filter DPF 220 is used to catch these soot particles. The exhaust stream 203 is here led through a filter structure, wherein soot particles from the exhaust stream 203 are caught passing through, and are stored in the particulate filter 220.

The oxidation catalyst DOC 210 has several functions, and is normally used primarily in the exhaust purification to oxidize remaining hydrocarbons $C_aH_b$ (also referred to as HC) and carbon monoxide CO in the exhaust stream 203 into carbon dioxide $CO_2$ and water $H_2O$. The oxidation catalyst DOC 210 may also oxidize a large fraction of the nitrogen monoxides NO occurring in the exhaust stream into nitrogen dioxide $NO_2$. The oxidation of nitrogen monoxide NO into nitrogen dioxide $NO_2$ is important to the nitrogen dioxide based soot oxidation in the filter, and is also advantageous at a potential subsequent reduction of nitrogen oxides $NO_x$. In this respect, the exhaust treatment system 250 further comprises an SCR (Selective Catalytic Reduction) catalyst 230, downstream of the particulate filter DPF 220. SCR catalysts use ammonia $NH_3$, or a composition from which ammonia may be generated/formed, e.g. urea, as an additive for the reduction of nitrogen oxides NO in the exhaust stream. The reaction rate of this reduction is impacted, however, by the ratio between nitrogen monoxide NO and nitrogen dioxide $NO_2$ in the exhaust stream, so that the reductive reaction is impacted in a positive direction by the previous oxidation of NO into $NO_2$ in the oxidation catalyst DOC. This applies up to a value representing approximately 50% of the molar ratio $NO_2/NO_x$. For higher fractions of the molar ratio $NO_2/NO_x$, that is to say for values exceeding 50%, the reaction speed is impacted in a strongly negative manner.

As mentioned above, the SCR-catalyst 230 requires additives to reduce the concentration of a compound, such as for example nitrogen oxides $NO_x$, in the exhaust stream 203. Such additive is injected into the exhaust stream upstream of the SCR-catalyst 230 (not displayed in FIG. 2). Such additive is traditionally ammonia and/or urea based, or consists of a substance from which ammonia may be extracted or released, and may for example consist of AdBlue, which basically consists of urea mixed with water. Urea forms ammonia at heating (thermolysis) and at heterogeneous catalysis on an oxidizing surface (hydrolysis), which surface may, for example, consist of titanium dioxide $TiO_2$, within the SCR-catalyst. The exhaust treatment system may also comprise a separate hydrolysis catalyst.

The exhaust treatment system 250 is also equipped with an ammonia slip catalyst (ASC) 240, which is arranged to oxidize an excess of ammonia that may remain after the SCR-catalyst 230.

The exhaust treatment system 250 is also equipped with one or several sensors, such as one or several $NO_x$— and/or temperature sensors 261, 262, 263, 264 for the determination of nitrogen oxides and/or temperatures in the exhaust treatment system.

The prior art exhaust treatment system displayed in FIG. 2, that is to say the Euro VI-system, has a problem in that catalysts are efficient heat exchangers, which jointly with the rest of the exhaust system, comprising for example the exhaust conduit 202, as well as material and space for silencing and various connections, has a substantial thermal mass/inertia. At starts where the catalyst temperature is below its optimal operating temperature, which may for example be approximately 300° C., and at an increased power output from low exhaust temperatures, which may for example occur when light city driving transitions into motorway driving, or after idling and power take-off, the exhaust temperature is filtered by this large thermal mass. Accordingly, the function, and therefore the efficiency of the reduction, is impacted by for example nitrogen oxides $NO_x$ in the SCR-catalyst 230, which may entail that a poor exhaust purification is provided by the system displayed in FIG. 2. This means that a smaller amount of emitted nitrogen oxides $NO_x$ may be permitted to be released from the engine 101, compared to if the exhaust purification had been more efficient, which may lead to requirements for a more complex engine and/or a lower fuel efficiency.

In the prior art exhaust treatment system there is also a risk that the relatively cold reductant cools down the exhaust pipe parts locally, and may thereby give rise to precipitates. This risk of precipitates downstream of the injection increases if the injected amount of reductant must be large.

Among others to compensate for the limited availability of heat/temperature at, for example, cold starts and operation with a low load, a so-called fast SCR may be used, for controlling reduction, so that it occurs to as great an extent as possible via reaction paths over both nitrogen oxide NO and nitrogen dioxide $NO_2$. With a fast SCR, the reaction uses equal parts of nitrogen monoxide NO and nitrogen dioxide $NO_2$, which means that an optimal value of the molar ration $NO_2/NO_x$ is near 50%.

In some conditions regarding the catalyst temperature and flow, i.e. for a certain dwell-time in the catalyst ("Space Velocity"), there is a risk that a non-advantageous fraction of nitrogen dioxides $NO_2$ is obtained. Specifically, there is a risk that the ratio $NO_2/NO_x$ exceeds 50%, which may constitute a real problem for exhaust purification. An optimization of the ratio $NO_2/NO_x$ for the above mentioned critical low temperature operating modes, therefore risks providing too high a fraction of nitrogen dioxides $NO_2$ in other operating modes, at for example higher temperatures. This higher fraction of nitrogen dioxides $NO_2$ results in a greater volume requirement for the SCR-catalyst, and/or in a limitation of the amount of nitrogen oxides released from the engine, and accordingly in a poorer fuel efficiency for the vehicle. In addition, there is a risk that the higher fraction of nitrogen dioxides $NO_2$ also results in emissions of laughing gas $N_2O$. These risks of a non-advantageous fraction of nitrogen monoxide $NO_2$ arising also exist due to the system's ageing. For example, the ratio $NO_2/NO_x$ may assume lower values when the system has aged, which may entail that a catalyst specification, which results in too high fractions of $NO_2/NO_x$ in a non-aged state, must be used to compensate for ageing.

A poor control robustness against dosage errors regarding the amount of reductant and/or a poor control robustness against a sensor error may also constitute a problem for the exhaust treatment system at high $NO_x$-conversion levels.

FIG. 3a schematically shows an exhaust treatment system 350 according to one embodiment of the present invention, which system is connected to a combustion engine 301 via an exhaust conduit 302. Exhausts generated at combustion in the engine 301 are led in an exhaust stream 303 (indicated with arrows) to a first reduction catalyst device 331. The first reduction catalyst device 331 is arranged for reduction of nitrogen oxides $NO_x$ in the exhaust stream 303, through the use of compounds comprising one or several of carbon monoxide CO and hydrocarbons HC, which compounds are comprised in the exhaust stream 303 when it reaches the first reduction catalyst device 331. In more detail, the first reduction catalyst device 331 uses one or several compounds, which occur naturally or are created in the exhausts from a combustion engine 301, at the reduction of the nitrogen oxides $NO_x$ in the exhaust stream 303.

According to one embodiment of the present invention at least the following simplified reactions may, for example, be carried out by the first reduction catalyst device 331:

$$HC+NO_x \rightarrow N_2+CO_2+H_2O; \qquad \text{(Equation 1)}$$

and

$$CO+NO_x \rightarrow N_2+CO_2. \qquad \text{(Equation 2)}$$

In these simplified reaction formulas HC represents one or several hydrocarbon compounds $C_aH_b$. Both equation 1 and equation 2 provide a reduction of nitrogen oxides $NO_x$, wherein HC and CO, respectively, are used at the reduction.

According to one embodiment of the present invention, the combustion engine 301 may be controlled, within one or several selected operating areas, to burn the fuel injected into the engine in such a manner, that elevated levels of compounds comprising one or several of carbon monoxide CO and hydrocarbons HC occur in the exhaust stream 303, wherein such elevated levels of the compounds may be used at the first reduction.

The exhaust treatment system 350 according to the present invention comprises a particulate filter 320 downstream of the first reduction catalyst device 331, which filter is arranged to catch and oxidize soot particles. The exhaust stream 303 is here led through the filter structure of the particulate filter, where soot particles are caught in the filter structure from the exhaust stream 303 passing through, and are stored and oxidized in the particulate filter.

According to one embodiment of the present invention, the exhaust treatment system 350 comprises a first oxidation catalyst 311 arranged upstream of the first reduction catalyst 331. In this case, the first oxidation catalyst 311 is arranged to carry out a first oxidation and/or a disintegration of compounds comprising one or several of nitrogen, carbon and hydrogen in the exhaust stream 303, and/or to create an exothermic reaction.

According to one embodiment of the invention, the particulate filter 320 is arranged so that the particulate filter 320 is the first exhaust treatment system component reached by the exhaust stream 303, after it has passed the first reduction catalyst device 331. In other words, the particulate filter 320 according to the embodiment is connected downstream of the reduction catalyst device 331, without any intermediate exhaust treatment system components, except potential conduit connections between the reduction catalyst device 331 and the particulate filter 320.

According to another embodiment of the present invention, the exhaust treatment system 350 comprises a second oxidation catalyst 312, arranged downstream of the first reduction catalyst device 331 and upstream of the particulate filter 320 to carry out a second oxidation and/or a disintegration of compounds comprising one or several of nitrogen, carbon and hydrogen in said exhaust stream 303, and/or to create an exothermic reaction.

According to one embodiment of the present invention, the exhaust treatment system 350 comprises a third oxidation catalyst 313, arranged downstream of the particulate filter 320 and upstream of the second reduction catalyst device 332 to carry out a third oxidation and/or a disintegration of compounds comprising one or several of nitrogen, carbon and hydrogen in said exhaust stream 303, and/or to create an exothermic reaction.

As described in more detail below, according to one embodiment the first reduction catalyst device 331 may comprise a first catalytic reduction catalyst $CR_1$, a first catalytic reduction catalyst $CR_1$ downstream followed by a first slip-catalyst $SC_1$, a first slip-catalyst $SC_1$ downstream following by a first catalytic reduction catalyst device $CR_1$, or only a first slip-catalyst $SC_1$.

According to one embodiment of the present invention, the particulate filter DPF 320 is a traditional non-coated particulate filter, that is to say a particulate filter DPF without any catalytically oxidizing coating.

According to another embodiment of the present invention, the particulate filter 320 is at least partly is coated with a catalytically oxidizing coating, wherein such oxidizing coating may comprise at least one precious metal. That is to say, the particulate filter 320 may at least partly be coated with one or several precious metals, for example platinum. According to one embodiment of the present invention, the coating of the filter is arranged in the first part of the filter, that is to say, in connection with the inflow of the filter. This may also be expressed as the coating, for example comprising one or several precious metals, being placed at that end of the filter, where the exhaust stream flows into the filter. The particulate filter cDPF 320, comprising the oxidizing coating, has several advantages compared to a classic particulate filter DPF, without an oxidizing coating. The particulate filter cDPF 320, comprising the oxidizing coating, leads to an improved $NO_2$-based regeneration of the filter, that is to say to an improved $NO_2$-based soot oxidation, which may also be referred to as a passive regeneration of the filter. The particulate filter cDPF 320, which comprises the oxidizing coating, also results in more stable conditions for the nitrogen dioxide level $NO_2$ at the second reduction catalyst device 332. Additionally, the use of the particulate filter cDPF 320, comprising the oxidizing coating, means that the value for the ratio $NO_2/NO_x$, that is to say the level of $NO_2$, may be controlled.

The particulate filter 320, which at least partly comprises a catalytically oxidizing coating, may also oxidize soot particles and one or several incompletely oxidized nitrogen and/or carbon compounds more efficiently, thanks to the oxidizing coating.

According to one embodiment of the present invention, the particulate filter 320 is at least partly coated with a catalytically reducing coating arranged for reduction of nitrogen oxides $NO_x$.

The system according to the embodiment of the present invention relates to cleaning the filter of soot with the $NO_2$-based passive regeneration. However, the present invention may also advantageously be used in connection with active regeneration of the filter, which is to say when the regeneration is initiated by an injection of fuel upstream of the filter, for example through the use of an injector. At an active regeneration, the exhaust treatment system according to the invention has one advantage in that the first reduction catalyst device may itself cope with a certain $NO_x$-conversion during the time when, due to the regeneration, the second reduction catalyst device, arranged downstream of the filter, experiences such a high temperature that it has difficulties in achieving a high conversion level.

At the use of the engine's injection system at a regeneration of the particulate filter DPF/cDPF, the first reduction catalyst device will at least partly assist the particulate filter DPF/cDPF with partly oxidizing the fuel into primarily carbon monoxide CO. Thus, the regeneration of the particulate filter DPF/cDPF is simplified, compared to exhaust treatment systems that do not have a first reduction catalyst device according to the present invention.

Downstream of the particulate filter 320, the exhaust treatment system 350 is equipped with a second dosage device 372, which is arranged to supply an additive to the exhaust stream 303, where such additive comprises ammonia $NH_3$, or a substance, for example AdBlue, from which ammonia may be generated/formed/released, as described above. According to one embodiment of the invention, a hydrolysis catalyst and/or a mixer may also be arranged in connection with the second dosage device 372. The hydrolysis catalyst may consist of substantially any adequate hydrolysis coating. The mixer may be arranged in connection with the second dosage device 372. The hydrolysis catalyst, and/or the mixer, are used to increase the speed of the decomposition of urea into ammonia, and/or to mix the additive with the emissions, and/or to vaporize the additive.

The exhaust treatment system 350 also comprises a second reduction catalyst device 332, which is arranged downstream of the second dosage device 372. The second reduction catalyst device 332 is arranged to reduce nitrogen oxides $NO_x$ in the exhaust stream 303, through the use of the additive.

The exhaust treatment system 350 may also be equipped with one or several sensors, such as one or several $NO_x$ sensors and/or temperature sensors 361, 363, 364, which are arranged for the determination of $NO_x$-concentrations and temperatures in the exhaust treatment system 350, respectively. The temperature sensors 361, 362, 363, 364 may, as illustrated in FIGS. 3a-b, be arranged upstream and/or downstream of the components 331, 320, 332 in the exhaust treatment system 350. Temperature sensors may also be arranged in/at/on one or several of the components 331, 320, 332 in the exhaust treatment system 350.

Representations of one or several temperatures for the reduction catalyst device may be based, for example, on measured, modelled and/or predicted temperatures in the exhaust treatment system, for example using one or several temperature sensors described herein, which may be arranged in/at/on, upstream and/or downstream of the respective reduction catalyst device.

The placement of the $NO_x$-sensor 363 between the two dosage devices 371, 372 and, preferably, between the particulate filter DPF/cDPF 320 and the second dosage device 372, also makes it possible to correct the amount of additive administered by the second dosage device 372 for nitrogen oxides $NO_x$, which may be created over the particulate filter DPF/cDPF 320.

The $NO_x$-sensor 364 downstream of the second reduction catalyst device 332 may be used at feedback of dosage of additive.

The one or several sensors 361, 362, 363, 364 may be connected to a control device 360, which is arranged to provide one or several control signals, which may be used at control of the combustion engine 301 in order for a desired amount of compounds comprising one or several of carbon monoxide CO and hydrocarbons HC to be present in the exhaust stream 303 emitted from the combustion engine 301. This desired amount of compounds comprising one or several of carbon monoxide CO and hydrocarbons HC may thus be controlled in such a manner that the compounds may be used by the first reduction catalyst device 331 at the first reduction of nitrogen oxides $NO_x$.

According to a couple of embodiments of the present invention, the active control of the combustion engine 301 comprises a selection of at least one injection strategy for the combustion engine.

According to one embodiment of the present invention, the timing of injections of fuel into the respective cylinder in the combustion engine may be controlled in such a manner that a desired amount of compounds comprising one or several of carbon monoxide CO and hydrocarbons HC is present in the exhaust stream 303 emitted from the combustion engine 301.

According to one embodiment of the present invention, the injection pressure for injections of fuel into the respective cylinder in the combustion engine may be controlled in such a manner that a desired amount of compounds comprising one or several of carbon monoxide CO and hydrocarbons HC is present in the exhaust stream 303 emitted from the combustion engine 301.

According to one embodiment of the present invention, an injection phasing for injections of fuel into the respective cylinder may be controlled in such a manner that a desired amount of compounds comprising one or several of carbon monoxide CO and hydrocarbons HC is present in the exhaust stream 303 emitted from the combustion engine 301. Injection phasing, as the term is used herein, means how the injection changes over time, for example how the pressure for the injection changes over time. A representation (measure) of injection phasing may for example be a time derivative for the cylinder pressure.

According to one embodiment of the present invention, the active control of the combustion engine 301 comprises control of a device for exchange gas recirculation (EGR). Combustion engines are supplied with air at an inlet, to achieve a gas mixture which is suitable for combustion, together with fuel that is also supplied to the engine. The combustion takes place in the engine's cylinders, wherein the gas mixture is burned. The combustion generates exhausts, which leave the engine at an outlet. The exhaust recirculation conduit is arranged from the engine's outlet to its inlet, and leads back a part of the exhausts from the outlet to the inlet. Thus, the suction losses at air intake may be reduced and the amount of compounds comprising one or several of carbon monoxide CO and hydrocarbons HC from the engine may be adjusted.

According to one embodiment of the present invention, the exhaust treatment system 350 comprises a system 370 for supply of additive, which comprises at least one pump 373 arranged to supply the second 372 dosage devices with additive, that is to say for example ammonia or urea.

The system 370 supplies, according to one embodiment, the second 372 dosage device with additive in liquid form. Additive in liquid form may be filled up at many filling/petrol stations where fuel is provided, ensuring that the additive may be refilled, and accordingly ensuring an optimized use of the exhaust treatment system. Today, there are thus already existing distribution networks for liquid additives, ensuring the availability of additive where the vehicle is driven.

Additive in liquid form may be filled up at many filling/petrol stations where fuel is provided, ensuring that the additive may be refilled, and accordingly ensuring an optimized use of the exhaust treatment system.

According to another embodiment, the system 370 supplies the second 372 dosage device with additive in gaseous form. According to one embodiment, this additive may consist of hydrogen $H_2$ and/or ammonia gas $NH_3$.

One example of such a system 370 for supply of additive is displayed schematically in FIG. 3a, where the system comprises the second dosage device 372, which is arranged upstream of the second reduction catalyst 332. The second dosage device 372, often consisting of a dosage nozzle, which administers additive to, and mixes such additive with, the exhaust stream 303, is supplied with additive by the at least one pump 373, via conduits 375 for additive. The at least one pump 373 obtains additive from one or several tanks 376 for additive, via one or several conduits 377 between the tank/tanks 376, and the at least one pump 373. It should be realized here that the additive may be in liquid form and/or gaseous form, as described above. Where the additive is in liquid form, the pump 373 is a liquid pump, and the one or several tanks 376 are liquid tanks. Where the additive is in gaseous form, the pump 373 is a gas pump, and the one or several tanks 376 are gas tanks. If both gaseous and liquid additives are used, several tanks and pumps are arranged, wherein at least one tank and one pump are set up to supply liquid additive, and at least one tank and one pump are set up to supply gaseous additive.

The specific function of the additive system 370 is well described in prior art technology, and the exact method for the injection of additive is therefore not described in any further detail herein. Generally, however, the temperature at the point of injection/SCR-catalyst should be above a lower threshold temperature to avoid precipitates and formation of unwanted by-products, such as ammonium nitrate $NH_4NO_3$. An example of a value for such a lower threshold temperature may be approximately 200° C. According to one embodiment of the invention, the system 370 for supply of additive comprises a dosage control device 374, arranged to control the at least one pump 373, so that the additive is supplied to the exhaust stream. The dosage control device 374 comprises, according to one embodiment, a second pump control device 379, arranged to control the at least one pump 373, so that a second dosage of the additive is supplied to the exhaust stream 303, via the second dosage device 372.

The one or several pumps 373 are thus controlled by a dosage control device 374, which generates control signals for the control of supply of additive, so that a desired amount is injected into the exhaust stream 303 with the help of the second reduction catalyst device 332.

The dosage control device 374 may also be connected to the control device 360, which is arranged to provide control signals for the combustion engine 301. Thus, the control device 360 may base the creation of these control signals also on information from the dosage control device 374, so that regard may be had to dosage of additive at the control of the combustion engine 301, and vice versa.

It should be noted that the exhaust treatment system according to the embodiment displayed in FIG. 3a does not need to have a first dosage upstream of the first reduction catalyst device 331, since the first reduction in the first reduction catalyst device 331 may be carried out based on compounds of carbon monoxide and/or hydrocarbons HC occurring naturally or created in/introduced into the exhaust stream 303.

FIG. 3b schematically shows an exhaust treatment system 350 according to one embodiment of the present invention, which treats exhausts generated at combustion in the combustion engine 301. FIG. 3b has a large number of components in common with the exhaust treatment system illustrated in FIG. 3a and described above. These common components in FIG. 3b have corresponding functions as described above in relation to FIG. 3a, and accordingly they are not described in detail in relation to FIG. 3b.

The exhaust treatment system according to the embodiments illustrated in FIG. 3b thus comprise the features for the embodiments illustrated in FIG. 3a. Additionally, the exhaust treatment system comprises, according to the embodiment illustrated in FIG. 3b, a system 370 for supply of additive, which system comprises at least one pump 373 arranged to supply the first dosage device 371 with compounds comprising carbon monoxide CO and/or hydrocarbons HC, and to supply the second dosage device 372 with additive, that is to say for example ammonia or urea.

The system 370 supplies, according to one embodiment, at least one of the first 371 and the second 372 dosage devices with carbon monoxide CO and/or hydrocarbons HC and additive, respectively, in liquid form.

Additive in liquid form may be filled up at many filling/petrol stations where fuel is provided, so that the filling of additive may be ensured. The compounds comprising carbon monoxide CO and/or hydrocarbons HC may also be filled up in certain filling/petrol stations, for example in the form of diesel, natural gas, bio gas or ethanol, which means these compounds are available basically everywhere.

This means that an optimal use of both the first and the second dosage device may be reliably provided in different types of operation. The optimized use is then, for example, not limited to the first dosage device being used only at cold starts. Today, there are thus already existing distribution networks for liquid additives and compounds, ensuring the availability of additive and compounds where the vehicle is driven.

The total exhaust treatment system's secondary emission of, for example, ammonia $NH_3$, nitrogen dioxides $NO_2$, and/or laughing gas $N_2O$ at ordinary operation of the combustion engine, that is to say not only at cold starts, may be reduced through the use of one embodiment of the present invention, by way of carbon monoxide CO and/or hydrocarbons HC being administered at the first 371 dosage device and the additive being administered at the second 372 dosage device. This presumes, however, that it is possible to provide a substantially continuous dosage at the use of the embodiment. By using additive and compounds in liquid form, the additive lasts longer without interruption for service, since additive and compounds in liquid form are available for purchase at ordinary petrol stations. Accordingly, substantially continuous dosage with both the first 371 and the second 372 dosage device may be made during the entire normal service intervals for a vehicle.

The possibility of substantially continuous dosage with both the first 371 and second 372 dosage device means that the exhaust treatment system may be used to its full potential. Thus, the system may be controlled in such a manner that robust and very high total levels of $NO_x$-conversion may be obtained over time, without the system having to compensate for running out of additive and/or CO/HC-compounds. The secured availability of additive and/or compounds also means that a reliable control of the $NO_2$-level $NO_2/NO_x$ may always be carried out, that is to say during the entire service interval.

According to another embodiment, the system 370 supplies at least one of the first 371 and the second 372 dosage devices with CO/HC-compounds and additive, respectively, in gaseous form. According to one embodiment, this additive may consist of hydrogen gas $H_2$ and/or ammonia gas $NH_3$.

One example of such a system 370 for supply of additive is displayed schematically in FIG. 3b, where the system comprises the first dosage device 371 and the second dosage device 372, which are arranged upstream of the first reduction catalyst 331, and upstream of the second reduction catalyst 332, respectively. The first and second dosage devices 371, 372, often consisting of dosage nozzles administering CO/HC-compounds and additive, respectively, to, and mixing these with the exhaust stream 303, are supplied with CO/HC-compounds and additive, respectively, by the at least one pump 373, via conduits 375 for additive. The at least one pump 373 obtains CO/HC-compounds and additive, respectively, from two or more tanks 376a-b for additive, via two or more conduits 377 between the tanks 376a-b, and the at least one pump 373. It should be realized here that the CO/HC-compounds and additive, respectively, may be in liquid form and/or gaseous form, as described above. Where the CO/HC-compounds and additive, respectively, are in liquid form, the pump 373 is a liquid pump, and the two or more tanks 376a-b are liquid tanks. Where the CO/HC-compounds and additive, respectively, are in gaseous form, the pump 373 is a gas pump, and the two or more tanks 376a-b are gas tanks. If both gaseous and liquid CO/HC-compounds and additives, respectively, are used, several tanks and pumps are arranged, wherein at least one tank and one pump are set up to supply liquid CO/HC-compounds and additive, respectively, and at least one tank and one pump are set up to supply gaseous CO/HC-compounds and additive, respectively.

According to the embodiment, illustrated in FIG. 3b, there are compounds comprising carbon monoxide CO and/or hydrocarbons HC in the exhaust stream 303 when this reaches the first reduction catalyst device 331, having been partly released by the combustion engine 301 and partly supplied to the exhaust stream by the first dosage device 371. The first reduction catalyst device 331 is, as described above, arranged to carry out a reduction of nitrogen oxides $NO_x$ in the exhaust stream 303 with the use of these compounds comprising carbon monoxide CO and/or hydrocarbons HC, present in the exhaust stream.

According to one embodiment of the invention, the at least one pump 373 comprises a joint pump, which feeds both the first 371 and the second 372 dosage device with the CO/HC-compounds and additive, respectively. According to another embodiment of the invention, the at least one pump comprises a first and a second pump, which feed the first 371 and the second 372 dosage device, respectively, with CO/HC-compounds and additive, respectively.

The specific function of the additive system 370 is well described in prior art technology, and the exact method for the injection of additive is therefore not described in any further detail herein. Generally, however, the temperature at the point of injection/SCR-catalyst should be above a lower threshold temperature to avoid precipitates and formation of unwanted by-products, such as ammonium nitrate $NH_4NO_3$. An example of a value for such a lower threshold temperature may be approximately 200° C. According to one embodiment of the invention, the system 370 for supply of additive comprises a dosage control device 374, arranged to control the at least one pump 373 in such a manner that the CO/HC-compounds and additive, respectively, are supplied to the exhaust stream. The dosage control device 374 comprises, according to one embodiment, a first pump control device 378 arranged to control the at least one pump 373, in such a manner that a first dosage of CO/HC-compounds is supplied to the exhaust stream 303, via the first dosage device 371. The dosage control device 374 also comprises a second pump control device 379, arranged to control the at least one pump 373, in such a manner that a second dosage of the additive is supplied to the exhaust stream 303, via the second dosage device 372.

The one or several pumps 373 are thus controlled by a dosage control device 374, which generates control signals for the control of supply of CO/HC-compounds and additive, respectively, so that a desired amount is injected into the exhaust stream 303 with the help of the first 371 and the second 372 dosage device, respectively, upstream of the first 331 and the second 332 reduction catalyst device, respectively. In more detail, the first pump control device 378 is arranged to control either a joint pump, or a pump dedicated to the first dosage device 371, so that the first dosage is controlled to be supplied to the exhaust stream 303 via the first dosage device 371. The second pump control device 379 is arranged to control either a joint pump, or a pump dedicated to the second dosage device 372, so that the second dosage is controlled to be supplied to the exhaust stream 303 via the second dosage device 372.

The dosage control device 374 may also be connected to the control device 360, which is arranged to provide control signals for the combustion engine 301. Thus, the control device 360 may base the creation of these control signals also on information from the dosage control device 374, so that regard may be had to dosage of CO/HC-compounds and additive, respectively, at the control of the combustion engine 301, and vice versa.

A robustness against errors in administered doses of CO/HC-compounds may be achieved by way of an embodiment of the invention, wherein an $NO_x$-sensor 363 is placed between the two dosage devices 371, 372, and preferably between the particulate filter 320 and the second dosage device 372, in the exhaust treatment system 350. This makes it possible, by way of the second dosage device 372, to correct a potential dosage error, which has created unforeseen emission levels downstream of the first reduction device 371 and/or the particulate filter 320.

This placement of the $NO_x$-sensor 363 between the two dosage devices 371, 372 and, preferably, between the particulate filter cDPF 320 and the second dosage device 372, also makes it possible to correct the amount of additive administered by the second dosage device 372 for nitrogen oxides $NO_x$, which, according to one embodiment, may be created over the particulate filter cDPF 320 with catalytic coating, from excess residues of CO/HC-compounds from the dosage carried out by the first dosage device 371.

The $NO_x$-sensor 364 downstream of the second reduction catalyst device 332 may be used at feedback of dosage of additive.

Through the use of the exhaust treatment system 350 displayed in FIGS. 3a-b, both the first reduction catalyst device 331 and the second reduction catalyst device 332 may be optimized with respect to a selection of catalyst characteristics for the reduction of nitrogen oxides $NO_x$, and/or with respect to volumes for the first 331 and second 332 reduction catalyst devices, respectively. With the present invention, the particulate filter 320 is used to the advantage of the function, by having regard to how its thermal mass impacts the temperature of the second reduction catalyst 332. For those embodiments where the particulate filter has a catalytic coating cDPF, the function of the particulate filter cDPF may also be used as an advantage by having regard to how its catalytic coating affects the $NO_2/NO_x$-fraction upstream of the second reduction catalyst 332 at exhaust purification.

By having regard to the thermal inertia of the particulate filter 320, the first reduction catalyst device 331 and the second reduction catalyst device 332, respectively, may be optimized with respect to the specific temperature function each will experience. Since, according to the present invention, the optimized first 331 and second 332 reduction catalyst devices are set up to purify the exhausts in cooperation, the exhaust treatment system 350 may be made compact. Since the space allocated to the exhaust treatment system 350 for example in a vehicle is limited, it is a great advantage to provide a compact exhaust treatment system, through a high usage level of the catalysts used according to the present invention. Such high usage level and the associated smaller volume requirement also provide a possibility for a reduced back pressure, and accordingly also a lower fuel consumption.

The present invention provides for an exhaust treatment system 350, which efficiently reduces the amount of nitrogen oxides $NO_x$ in the exhaust stream in substantially all driving modes, comprising especially cold starts and increased power output, that is to say increased requested torque, from a low exhaust temperature and a load reduction, that is to say at a reduced requested torque. Thus, the exhaust treatment system 350 according to the present invention is suitable in substantially all driving modes, which give rise to a transient temperature evolution in the exhaust treatment. One example of such a driving mode may consist of city driving comprising many starts and decelerations.

The problems with prior art technology, which are related to a too high fraction of nitrogen dioxides $NO_2$, may be resolved at least partly with the use of the present invention, since two reduction catalyst devices 371, 372 are comprised in the exhaust treatment system 350. The problem may be resolved by way of combining the present invention with the knowledge that the amount of nitrogen oxides $NO_x$ controls how large a fraction of nitrogen dioxides $NO_2$ is obtained downstream of a filter and/or substrate coated with a catalytic oxidizing coating, that is to say that the amount of nitrogen oxides $NO_x$ may be used to control the value of the ratio $NO_2/NO_x$. By reducing the nitrogen oxides $NO_x$ over the first reduction catalyst device 371 during operation at low temperatures, a requirement regarding a given ratio between nitrogen dioxide and nitrogen oxides $NO_2/NO_x$ in the exhausts reaching the second reduction catalyst device 372 may be fulfilled with a smaller, and accordingly less costly, amount of oxidizing coating.

The present invention has an advantage in that the added manufacturing cost as a consequence of the invention may be kept at a low level, since the oxidation catalyst DOC 210, available in prior art systems at manufacture, according to one embodiment of the invention may be replaced by the first reduction catalyst device 331 according to the present invention. According to one embodiment of the present invention, a first dosage device is not required either, since the first reduction in the first reduction catalyst device 331 takes place through reactions with carbon monoxide CO and/or hydrocarbons HC, which occur naturally or are created in/introduced into the exhaust stream. Thus, a manufacturing operation, comprising assembly of the oxidation catalyst DOC 210, may easily be replaced with another manufacturing operation, comprising assembly of the first reduction catalyst device 331 according to the present invention. This results in a minimal added cost to the assembly and/or manufacturing.

Since the oxidation catalyst DOC 210, which was present in prior art systems, may be replaced with the first reduction catalyst device 331 according to the present invention, retrofitting on already manufactured units, comprising exhaust treatment systems according to the Euro VI-specification, is possible.

For certain embodiments of the present invention a first dosage device 371 is used, as described above, for administration of carbon monoxide CO and/or hydrocarbons HC. Here, compounds comprising carbon monoxide CO and/or hydrocarbons HC, emitted from the engine and/or added with the first dosage device 371, are used at the reduction in the first reduction catalyst device. For these embodiments, an additional dosage device is required to be fitted in the exhaust treatment system.

The first reduction catalyst device 331 in the exhaust treatment system 350 is, according to one embodiment, active at a lower reduction temperature interval $T_{red}$, at least partly differing from the oxidation temperature interval $T_{ox}$, at which the nitrogen dioxide based soot oxidation of incompletely oxidized carbon compounds in the particulate filter 320 is active. For example, the reduction temperature interval $T_{red}$ may be lower than the oxidation temperature interval $T_{ox}$, wherein the temperature for a so-called "light-off" for soot oxidation in the particulate filter 320 may be higher than "light-off" for the reduction of nitrogen oxides $NO_x$ in the first reduction catalyst device 331. Accordingly, the reduction of nitrogen oxides $NO_x$ in the first reduction catalyst device 331 does not necessarily compete with the soot oxidation in the particulate filter 320, since they are active within at least partly different temperature intervals; $T_{red} \neq T_{ox}$.

The exhaust treatment system sometimes requests, by way of control signals generated in the control device 360, that the engine generate heat for the exhaust treatment system to be able to achieve a sufficient efficiency with respect to exhaust purification. This heat generation is then achieved at the expense of the engine's efficiency relating to fuel consumption, which decreases. One advantageous characteristic of the exhaust treatment system according to the present invention, is that the first reduction catalyst device upstream of the filter may be made to react faster to such generated heat, than what would have been possible for example with the Euro VI-system. Therefore, less fuel is consumed overall with the use of the present invention.

According to one embodiment of the present invention, the engine is controlled so that it generates such heat with a scope making the first reduction catalyst device reach a certain given temperature/performance. Therefore, an efficient exhaust purification may be obtained, since the first reduction catalyst device may operate at a favorable temperature, while unnecessary heating, and therefore fuel inefficiency, is avoided.

As opposed to the above mentioned prior art solutions, the first reduction catalyst device 331 according to the present invention does not need to be closely connected to the engine and/or the turbo. The fact that the first reduction catalyst device 331 according to the present invention may be fitted further away from the engine and/or the turbo, and for example may be located in the silencer, has an advantage in that a longer mixing distance may be obtained in the exhaust stream, between the engine, and/or the turbo, and the first reduction catalyst device 331. This means that an improved utilization is obtained for the first reduction catalyst device 331. Meanwhile, thanks to the present invention the many advantages mentioned in this document associated with the potential reduction of nitrogen oxides $NO_x$ both upstream and downstream of the thermally inertial filter cDPF are achieved.

According to different embodiments of the present invention, the first reduction catalyst device 331, which is arranged to reduce nitrogen oxides $NO_x$ though the use of compounds comprising one or several of carbon monoxide CO and hydrocarbons HC, consists of one of:

a first catalytic reduction catalyst $CR_1$;

a first catalytic reduction catalyst $CR_1$, followed downstream by a first slip-catalyst $SC_1$, where the first slip-catalyst $SC_1$ is arranged to oxidize and/or disintegrate a residue of compounds comprising one or several of carbon monoxide CO and hydrocarbons HC, to assist $CR_1$ with further reduction of nitrogen oxides $NO_x$ in the exhaust stream 303 and/or to create an exothermic reaction;

a first slip-catalyst $SC_1$ downstream following by a first catalytic reduction catalyst $CR_1$, where the first slip-catalyst $SC_1$ is arranged to oxidize compounds comprising one or several of carbon monoxide CO and hydrocarbons HC and/or to assist the first catalytic reduction catalyst $CR_1$ with a reduction of nitrogen oxides $NO_x$ in the exhaust stream 303; and a first slip-catalyst $SC_1$, primarily arranged for reduction of nitrogen oxides $NO_x$, and secondarily for oxidation of a residue of compounds comprising one or several of carbon monoxide CO and hydrocarbons HC.

According to various embodiments the second reduction catalyst device 332, which carries out a reduction of nitrogen oxides $NO_x$, consists at least partly, by way of use of an additive, of one of:

a second selective catalytic reduction catalyst $SCR_2$; and a second selective catalytic reduction catalyst $SCR_2$, followed downstream by a second slip-catalyst $SC_2$, where the second slip-catalyst $SC_2$ is arranged to oxidize a residue of additive, where such residue may consist, for example, of urea, ammonia $NH_3$ or isocyanic acid HNCO, and/or to assist $SCR_2$ with a further reduction of nitrogen oxides $NO_x$ in the exhaust stream 303.

In this document, the term first slip-catalyst $SC_1$ is used to refer generally to a first catalyst arranged to oxidize and/or disintegrate CO- and/or HC-compounds in the exhaust stream 303, and/or which is arranged to be able to reduce residues of nitrogen oxides $NO_x$ in the exhaust stream 303 with the use of CO- and/or HC-compounds in the exhaust stream. According to one embodiment of the present invention, such a first slip-catalyst $SC_1$ is arranged primarily to reduce nitrogen oxides $NO_x$, and secondarily to oxidize and/or disintegrate the compounds, that is to say that the first slip-catalyst $SC_1$ is a multifunctional slip-catalyst. In other words, the multifunctional first slip-catalyst $SC_1$ may take care of slip-residues of compounds and/or may take care of slip-residues of nitrogen oxides $NO_x$. This may also be described as the slip-catalyst $SC_1$ being an extended ammonia slip-catalyst ASC, which is also set up to oxidize and/or decompose CO- and/or HC-compounds and to reduce nitrogen oxides $NO_x$ in the exhaust stream 303, so that a general/multifunctional first slip-catalyst $SC_1$ is obtained, which takes care of several types of slip, meaning it takes care of both nitrogen oxides $NO_x$ and/or residues of CO- and/or HC-compounds.

According to one embodiment of the present invention, at least the following reactions may be carried out in a first multifunctional slip-catalyst $SC_1$, comprised in the first reduction catalyst device 331, which reduces nitrogen oxides $NO_x$ and/or oxidizes compounds:

$$HC+O_2 \rightarrow H_2O+CO_2; \quad \text{(Equation 3)}$$

$$HC+NO_x \rightarrow N_2+CO_2; \quad \text{(Equation 4)}$$

and/or $$CO+NO_x \rightarrow NO_2+CO_2. \quad \text{(Equation 5)}$$

In these simplified reaction formulas HC represents one or several hydrocarbon compounds $C_aH_b$. Here, the reaction according to equation 3 results in an oxidation of hydrocarbons HC. The reactions according to equations 4 and 5 provide a reduction of nitrogen oxides $NO_x$, wherein HC and CO, respectively, are used at the reduction.

In order to obtain these characteristics, that is to say to obtain a first multifunctional slip-catalyst $SC_1$, the slip-catalyst may, according to one embodiment, comprise one or several substances comprised in platinum metals (PGM; Platinum Group Metals), that is to say one or several of iridium, osmium, palladium, platinum, rhodium and ruthenium. The slip-catalyst $SC_1$ may also comprise one or several other substances, which give the slip-catalyst similar characteristics as platinum group metals. The slip-catalyst may also comprise an $NO_x$-reducing coating, where the coating may for example comprise zeolite or vanadium. Zeolite may here be activated with an active metal, such as for example copper (Cu) or iron (Fe). The slip-catalyst $SC_1$ may also comprise silver Ag.

For the first 331 reduction catalyst device, its catalytic characteristics may be selected based on the environment to which it is exposed, or will be exposed to. Additionally, the catalytic characteristics for the first 331 and second 332 reduction catalyst device may be adapted, so that they may be allowed to operate in symbiosis with each other. The first 331 reduction catalyst device may also comprise one or several materials, providing the catalytic characteristic. For example, transition metals such as vanadium and/or tungsten may be used, for example in a catalyst comprising $V_2O_5/WO_3/TiO_2$. Metals such as iron and/or copper may also be comprised in the first 331 reduction catalyst device, for example in a zeolite-based catalyst. Silver Ag and/or platinum metals PGM may also be comprised in the first reduction catalyst, as mentioned above.

In this document, the term second slip-catalyst $SC_2$ is used generally to denote a catalyst, which is arranged to oxidize and/or disintegrate additive in the exhaust stream 303, and/or which is arranged so that it is able to reduce residual nitrogen oxides NO in the exhaust stream 303. The additive may, as mentioned above, comprise one or several of urea, ammonia $NH_3$ and isocyanic acid HNCO. According to one embodiment of the present invention, such a second slip catalyst $SC_2$ is arranged primarily to reduce nitrogen oxides $NO_x$, and secondarily to oxidize and/or disintegrate a residue of additive, that is to say that the second slip-catalyst $SC_2$ is a multifunctional slip-catalyst. In other words, the second multifunctional slip-catalyst $SC_2$ may take care of slip-residues of additive and/or may take care of slip-residues of nitrogen oxides $NO_x$. This may also be described as the second slip-catalyst $SC_2$ being an extended ammonia slip-catalyst ASC, which is set up to reduce nitrogen oxides and/or decompose additive and reduce nitrogen oxides $NO_x$ in the exhaust stream 303, so that a general/multifunctional second slip-catalyst $SC_2$ is obtained, which takes care of several types of slip, meaning it takes care of nitrogen oxides $NO_x$ and/or residues of additive.

According to one embodiment of the present invention, at least, for example, the following reactions may be carried out in a second multifunctional slip-catalyst $SC_2$, comprised in the second reduction catalyst device 332, which reduces nitrogen oxides $NO_x$ and/or oxidizes additive:

$$NH_3+O_2 \rightarrow N_2; \quad \text{(Equation 6)}$$

and/or $$NO_x+NH_3 \rightarrow N_2+H_2O. \quad \text{(Equation 7)}$$

Here, the reaction according to equation 6 results in an oxidation of additive, for example residues of additive comprising ammonia. The reaction according to equation 7 results in a reduction of nitrogen oxides $NO_x$. Accordingly, the additive, such as residue of ammonia $NH_3$, isocyanic acid HNCO, urea or similar, may be oxidized. These residues of additive, that is to say ammonia $NH_3$, HNCO, urea or similar, may here also be used to reduce nitrogen oxides $NO_x$.

In order to obtain these characteristics, that is to say to obtain a multifunctional slip-catalyst, the second slip-catalyst $SC_2$ may according to one embodiment comprise one or several substances comprised in platinum metals (PGM; Platinum Group Metals), that is to say one or several of iridium, osmium, palladium, platinum, rhodium and ruthenium. The slip-catalyst may also comprise one or several other substances, which give the slip-catalyst similar characteristics as platinum group metals. The slip-catalyst may also comprise an $NO_x$-reducing coating, where the coating may for example comprise zeolite or vanadium. Zeolite may here be activated with an active metal, such as for example copper (Cu) or iron (Fe).

For the second 332 reduction catalyst device, these catalytic characteristics may be selected based on the environment to which it is exposed, or will be exposed to. Additionally, the catalytic characteristics for the first 331 and second 332 reduction catalyst device may be adapted so that they may be allowed to operate in symbiosis with each other. The second 332 reduction catalyst device may also comprise one or several materials, providing the catalytic characteristic. For example, transition metals such as vanadium and/or tungsten may be used, for example in a catalyst comprising $V_2O_5/WO_3/TiO_2$. Metals such as iron and/or copper may also be comprised in the first 331 and/or second 332 reduction catalyst device, for example in a zeolite-based catalyst.

The exhaust treatment system 350, which is schematically illustrated in FIGS. 3a-b, may according to different embodiments accordingly have a number of different structures/configurations, which may be summarized as below, and where the respective units $CR_1$, $SCR_2$, DPF, cDPF, $SC_1$, $SC_2$ have the respective characteristics described in this entire document. A traditional particulate filter, that is to say an uncoated particulate filter, is here referred to as DPF. The particulate filter 320 with the at least partly catalytically oxidizing coating is here referred to as cDPF. The catalytically oxidizing coating may be adapted according to its characteristics, to oxidize nitrogen oxides NO on the one hand, and to oxidize incompletely oxidized carbon compounds on the other. Incompletely oxidized carbon compounds may for example consist of fuel residue created through the engine's injection system.

According to one configuration according to the invention, the exhaust treatment system comprises the structure $CR_1$-cDPF-$SCR_2$. That is to say, the exhaust treatment system 350 comprises a first catalytic reduction catalyst $CR_1$, followed downstream by a particulate filter cDPF with an at least partly catalytically oxidizing coating, followed downstream by a second selective catalytic reduction catalyst $SCR_2$. A symbiotic usage of the first catalytic reduction catalyst $CR_1$ and the second selectively catalytic reduction catalyst $SCR_2$ in the exhaust treatment system 350 may facilitate the omission of a second slip-catalyst $SC_2$ in the exhaust treatment system 350 for certain applications, for example at limited $NO_x$-levels, which result in limited conversion level requirements. This is an advantage, for example compared with the above mentioned Euro VI-system, in which a slip-catalyst is, in practice, required. Since an SCR-catalyst is typically cheaper than an SC-catalyst, thanks to this embodiment of the invention, the manufacturing cost may be reduced by omitting the second slip-catalyst $SC_2$.

The first catalytic reduction catalyst $CR_1$ may be used with the objective of generating heat, for example by oxidation of hydrocarbons HC in the exhaust stream, which enables regeneration of sulphur contaminated components, such as the first catalytic reduction catalyst $CR_1$ and/or components arranged downstream of the latter. At regeneration of the sulphur contaminated components, the amount of sulphur which is deposited in the components is reduced, that is to say in at least one of the first catalytic reduction catalyst $CR_1$ and components arranged downstream of the latter.

The use of the particulate filter cDPF 320 comprising the oxidizing coating results in an improved $NO_2$-based regeneration of the filter, more stable conditions for the nitrogen dioxide level $NO_2$ at the second reduction catalyst device 332 and/or a possibility of controlling the value for the $NO_2/NO_x$ ratio.

According to one configuration according to the invention, the exhaust treatment system comprises the structure $CR_1$-$SC_1$-cDPF-$SCR_2$. That is to say, the exhaust treatment system 350 comprises a first catalytic reduction catalyst $CR_1$, followed downstream by a first slip-catalyst $SC_1$, followed downstream by a particulate filter cDPF with an at least partly catalytically oxidizing coating, followed downstream by a second selective catalytic reduction catalyst $SCR_2$. As mentioned above, the use of both the first catalytic reduction catalyst $CR_1$, and the second selective catalytic reduction catalyst $SCR_2$ in the exhaust treatment system 350, facilitates the omission of a second slip-catalyst $SC_2$ in the exhaust treatment system 350 for some applications, which reduces the manufacturing cost for the vehicle. The use of the first slip-catalyst $SC_1$ facilitates a greater load, and therefore a better use of the first catalytic reduction catalyst $CR_1$.

According to one embodiment of the present invention, the first reduction catalyst device 331 here comprises a first slip-catalyst $SC_1$, which is multifunctional, and therefore reduces nitrogen oxides $NO_x$ by using residues of compounds comprising one or several of carbon monoxide CO and hydrocarbons HC, and which also oxidizes and/or disintegrates the residues of the compounds (as described above). This entails a number of advantages for the exhaust treatment system. The first slip-catalyst $SC_1$ may here be used in symbiosis with the first reduction catalyst $CR_1$, so that the activity of the first slip-catalyst $SC_1$, with respect to reduction of nitrogen oxides $NO_x$, and oxidation and/or decomposition of residues of the compounds, as well as the slip-catalyst's $SC_1$ deposition characteristics for the compounds, constitute a complement to the function of the first reduction catalyst $CR_1$. The combination of these characteristics for the first reduction catalyst device 331, comprising the first reduction catalyst $CR_1$ and the first slip-catalyst $SC_1$, means that a higher conversion level may be obtained over the first reduction catalyst device 331. In addition, the use of the first slip-catalyst $SC_1$ in the first reduction catalyst device 331 results in conditions making it possible to avoid that a non-selective oxidation of CO/HC-compounds occurs in components placed downstream of the first reduction catalyst device 331 in the exhaust treatment system.

The first catalytic reduction catalyst $CR_1$, and/or the first slip-catalyst $SC_1$, may be used with the objective of generating heat, for example by oxidation of hydrocarbons HC in the exhaust stream, which enables regeneration of sulphur contaminated components, such as the first catalytic reduction catalyst $CR_1$ and/or components arranged downstream of the latter. At regeneration of the sulphur contaminated components, the amount of sulphur which is deposited in the components is reduced, that is to say in at least one of the first catalytic reduction catalyst $CR_1$ and components arranged downstream of the latter.

The use of the particulate filter cDPF 320 comprising the oxidizing coating results in an improved $NO_2$-based regeneration of the filter, more stable conditions for the nitrogen dioxide level $NO_2$ at the second reduction catalyst device 332, and/or a possibility of controlling the value for the $NO_2/NO_x$ ratio.

According to one configuration according to the invention, the exhaust treatment system comprises the structure $CR_1$-cDPF-$SCR_2$-$SC_2$. That is to say, the exhaust treatment system 350 comprises a first catalytic reduction catalyst $CR_1$, followed downstream by a particulate filter cDPF with an at least partly catalytically oxidizing coating, followed downstream by a second selective catalytic reduction catalyst $SCR_2$, followed downstream by a second slip-catalyst $SC_2$. This exhaust treatment system 350 facilitates emission levels for nitrogen oxides $NO_x$ close to zero, since the second reduction catalyst $SCR_2$ may take a heavy load, for example by increased dosage of additive, since it is followed downstream by the second slip-catalyst $SC_2$. The use of the second slip-catalyst $SC_2$ results in additionally improved performance for the system, since additional slip may be taken care of by the second slip-catalyst $SC_2$.

The first catalytic reduction catalyst $CR_1$ may be used with the objective of generating heat, for example by oxidation of hydrocarbons HC in the exhaust stream, which enables regeneration of sulphur contaminated components, such as the first catalytic reduction catalyst $CR_1$ and/or components arranged downstream of the latter. At regeneration of the sulphur contaminated components, the amount of sulphur which is deposited in the components is reduced, that is to say in at least one of the first catalytic reduction catalyst $CR_1$ and components arranged downstream of the latter.

The use of the particulate filter cDPF 320 comprising the oxidizing coating results in an improved $NO_2$-based regeneration of the filter, more stable conditions for the nitrogen dioxide level $NO_2$ at the second reduction catalyst device 332, and/or a possibility of controlling the value for the $NO_2/NO_x$ ratio.

According to one configuration according to the invention, the exhaust treatment system comprises the structure $CR_1$-$SC_1$-cDPF-$SCR_2$-$SC_2$. That is to say, the exhaust treatment system 350 comprises a first catalytic reduction catalyst $CR_1$, followed downstream by a first slip-catalyst $SC_1$, followed downstream by a particulate filter cDPF with an at least partly catalytically oxidizing coating, followed downstream by a second selective catalytic reduction catalyst $SCR_2$, followed downstream by a second slip-catalyst $SC_2$.

This exhaust treatment system 350 facilitates emission levels for nitrogen oxides $NO_x$ close to zero, since the second reduction catalyst $SCR_2$ may be made to work hard, for example by increased dosage of additive, since it is followed downstream by the second slip-catalyst $SC_2$. The use of the second slip-catalyst $SC_2$ results in additionally improved performance for the system, since additional slip may be taken care of by the second slip-catalyst $SC_2$. The use of the second slip-catalyst $SC_2$ also facilitates a reduction of the starting temperature (the "light-off"-temperature) for the $NO_x$-reduction, and may also result in a greater load, and thus an improved utilization of the second selective catalytic reduction catalyst $SCR_2$.

According to one embodiment of the present invention, the first reduction catalyst device 331 here comprises a first slip-catalyst $SC_1$, which is multifunctional, and therefore reduces nitrogen oxides $NO_x$ by using residues of compounds comprising one or several of carbon monoxide CO and hydrocarbons HC, and which also oxidizes and/or disintegrates the residues of the compounds (as described above). This entails a number of advantages for the exhaust treatment system. The first slip-catalyst $SC_1$ may here be used in symbiosis with the first reduction catalyst $CR_1$, so that the activity of the first slip-catalyst $SC_1$, with respect to reduction of nitrogen oxides $NO_x$, and oxidation and/or decomposition of residues of the CO/HC-compounds, as well as the slip-catalyst's $SC_1$ deposition characteristics for the CO/HC-compounds, constitute a complement to the function of the first reduction catalyst $CR_1$. The combination of these characteristics for the first reduction catalyst device 331, comprising the first reduction catalyst $CR_1$ and the first slip-catalyst $SC_1$, means that a higher conversion level may be obtained over the first reduction catalyst device 331. In addition, the use of the first slip-catalyst $SC_1$ in the first reduction catalyst device 331 results in conditions making it possible to avoid that a non-selective oxidation of CO/HC-compounds occurs in components placed downstream of the first reduction catalyst device 331 in the exhaust treatment system.

The first catalytic reduction catalyst $CR_1$, and/or the first slip-catalyst $SC_1$, may be used with the objective of generating heat, for example by oxidation of hydrocarbons HC in the exhaust stream, which enables regeneration of sulphur contaminated components, such as the first catalytic reduction catalyst $CR_1$ and/or components arranged downstream of the latter. At regeneration of the sulphur contaminated components, the amount of sulphur which is deposited in the components is reduced, that is to say in at least one of the first catalytic reduction catalyst $CR_1$ and components arranged downstream of the latter.

The use of the particulate filter cDPF 320 comprising the oxidizing coating results in an improved $NO_2$-based regeneration of the filter, more stable conditions for the nitrogen dioxide level $NO_2$ at the second reduction catalyst device 332, and/or a possibility of controlling the value for the $NO_2/NO_x$ ratio.

According to one configuration according to the invention, the exhaust treatment system comprises the structure $SC_1$-cDPF-$SCR_2$. That is to say, the exhaust treatment system 350 comprises a first slip-catalyst $SC_1$, followed downstream by a particulate filter cDPF with an at least partly catalytically oxidizing coating, followed downstream by a second selective catalytic reduction catalyst $SCR_2$. Here as well, because of the use of both the first slip-catalyst $SC_1$, and the second selective catalytic reduction catalyst $SCR_2$, the second slip-catalyst $SC_2$ may be omitted from the exhaust treatment system 350 for certain applications.

According to one embodiment of the present invention, the first reduction catalyst device 331 here comprises only a slip-catalyst $SC_1$, which is multifunctional and both reduces nitrogen oxides $NO_x$ through the use of compounds comprising one or several of carbon monoxide CO and hydrocarbons HC, and also oxidizes and/or disintegrates the compounds (as described above). This entails a number of advantages for the exhaust treatment system.

The first slip-catalyst $SC_1$ may be used with the objective of generating heat, for example by oxidation of hydrocarbons HC in the exhaust stream, which also may facilitate regeneration of sulphur contaminated components, such as the catalyst and/or components arranged downstream of the latter. At the regeneration of the sulphur contaminated components, the amount of sulphur intercalated in the components is reduced.

The use of the particulate filter cDPF 320 comprising the oxidizing coating results in an improved $NO_2$-based regeneration of the filter, more stable conditions for the nitrogen dioxide level $NO_2$ at the second reduction catalyst device 332, and/or a possibility of controlling the value for the $NO_2/NO_x$ ratio.

According to one configuration according to the invention, the exhaust treatment system comprises the structure $SC_1$-cDPF-$SCR_2$-$SC_2$. That is to say, the exhaust treatment system 350 comprises a first slip-catalyst $SC_1$, followed downstream by a particulate filter cDPF with an at least partly catalytically oxidizing coating, followed downstream by a second selective catalytic reduction catalyst $SCR_2$, followed downstream by a second slip-catalyst $SC_2$. This exhaust treatment system 350 facilitates emission levels for nitrogen oxides $NO_x$ close to zero, since the second reduction catalyst $SCR_2$ may take a heavy load, that is to say take a relatively high dosage of the second additive, since it is followed downstream by the second slip-catalyst $SC_2$. The use of the second slip-catalyst $SC_2$ results in additionally improved performance for the system, since additional slip may be taken care of by the second slip-catalyst $SC_2$. The use of the second slip-catalyst $SC_2$ facilitates a reduction of the starting temperature (the "light-off" temperature) for the $NO_x$-reduction.

According to one embodiment of the present invention, the first reduction catalyst device 331 here comprises only a slip-catalyst $SC_1$, which is multifunctional and both reduces nitrogen oxides $NO_x$ through the use of compounds comprising one or several of carbon monoxide CO and hydrocarbons HC, and also oxidizes and/or disintegrates the compounds (as described above). This entails a number of advantages for the exhaust treatment system. The first slip-catalyst $SC_1$ may be used with the objective of generating heat, for example by oxidation of hydrocarbons HC in the exhaust stream, which also enables regeneration of sulphur contaminated components, such as the catalyst and/or components arranged downstream of the latter. At the regeneration of the sulphur contaminated components, the amount of sulphur intercalated in the components is reduced.

The use of the particulate filter cDPF 320 comprising the oxidizing coating results in an improved $NO_2$-based regeneration of the filter, more stable conditions for the nitrogen dioxide level $NO_2$ at the second reduction catalyst device 332, and/or a possibility of controlling the value for the $NO_2/NO_x$ ratio.

According to one configuration according to the invention, the exhaust treatment system comprises the structure $SC_1$-$CR_1$-cDPF-$SCR_2$. That is to say, the exhaust treatment system 350 comprises a first slip-catalyst $SC_1$, followed downstream by a first catalytic reduction catalyst $CR_1$, followed downstream by a particulate filter cDPF with an at least partly catalytically oxidizing coating, followed downstream by a second selective catalytic reduction catalyst $SCR_2$. As mentioned above, the use of both the first catalytic reduction catalyst $CR_1$, and the second selective catalytic reduction catalyst $SCR_2$ in the exhaust treatment system 350, facilitates the omission of a second slip-catalyst $SC_2$ in the exhaust treatment system 350 for some applications, which reduces the manufacturing cost for the vehicle. The use of the first slip-catalyst $SC_1$ facilitates a greater load, and therefore a better use of the first catalytic reduction catalyst $CR_1$.

According to one embodiment of the present invention, the first reduction catalyst device 331 here comprises only a slip-catalyst $SC_1$, which is multifunctional and both reduces nitrogen oxides $NO_x$ through the use of compounds comprising one or several of carbon monoxide CO and hydrocarbons HC, and also oxidizes and/or disintegrates the compounds (as described above), which entails a number of advantages for the exhaust treatment system. The first slip-catalyst $SC_1$ may here be used in symbiosis with the first reduction catalyst $CR_1$, so that the activity of the first slip-catalyst $SC_1$, with respect to reduction of nitrogen oxides $NO_x$, and oxidation of additive, as well as the slip-catalyst's $SC_1$ deposition characteristics for the CO/HC-compounds, constitute a complement to the function of the first reduction catalyst $CR_1$. The combination of these characteristics for the first reduction catalyst device 331, comprising the first reduction catalyst $CR_1$ and the first slip-catalyst $SC_1$, means that a higher conversion level may be obtained over the first reduction catalyst device 331. In addition, the use of the first slip-catalyst $SC_1$ in the first reduction catalyst device 331 results in conditions making it possible to avoid that a non-selective oxidation of CO/HC-compounds occurs in components placed downstream of the first reduction catalyst device 331 in the exhaust treatment system.

The first catalytic reduction catalyst $CR_1$, and/or the first slip-catalyst $SC_1$, may be used with the objective of generating heat, for example through oxidation of hydrocarbons HC in the exhaust stream, which enables regeneration of sulphur contaminated components, such as the catalyst and/or components arranged downstream of the latter. At the regeneration of the sulphur contaminated components, the amount of sulphur intercalated in the components is reduced. The use of the first slip-catalyst $SC_1$, upstream of the first catalytic reduction catalyst $CR_1$, results in good possibilities for creating this heat.

The use of the particulate filter cDPF 320 comprising the oxidizing coating results in an improved $NO_2$-based regeneration of the filter, more stable conditions for the nitrogen dioxide level $NO_2$ at the second reduction catalyst device 332, and/or a possibility of controlling the value for the $NO_2/NO_x$ ratio.

According to one configuration according to the invention, the exhaust treatment system comprises the structure $SC_1$-$CR_1$-cDPF-$SCR_2$-$SC_2$. That is to say, the exhaust treatment system 350 comprises a first slip-catalyst $SC_1$, followed downstream by a first catalytic reduction catalyst $CR_1$, followed downstream by a particulate filter cDPF with an at least partly catalytically oxidizing coating, followed downstream by a second selective catalytic reduction catalyst $SCR_2$, followed downstream by a second slip-catalyst $SC_2$. This exhaust treatment system 350 facilitates emission levels for nitrogen oxides $NO_x$ close to zero, since the second reduction catalyst $SCR_2$ may be made to work hard, for example by increased dosage of additive, since it is followed downstream by the second slip-catalyst $SC_2$. The use of the second slip-catalyst $SC_2$ also facilitates a reduction of the starting temperature (the "light-off"-temperature) for the $NO_x$-reduction, and may also result in a greater load, and thus an improved utilization of the second selective catalytic reduction catalyst $SCR_2$. The use of the second slip-catalyst $SC_2$ results in additionally improved performance for the system, since additional slip may be taken care of by the second slip-catalyst $SC_2$.

According to one embodiment of the present invention, the first reduction catalyst device 331 here comprises only a slip-catalyst $SC_1$, which is multifunctional and both reduces nitrogen oxides $NO_x$ through the use of compounds comprising one or several of carbon monoxide and hydrocarbons HC, and also oxidizes and/or disintegrates the compounds (as described above), which entails a number of advantages for the exhaust treatment system. The first slip-catalyst $SC_1$ may here be used in symbiosis with the first reduction catalyst $CR_1$, so that the activity of the first slip-catalyst $SC_1$, with respect to reduction of nitrogen oxides $NO_x$, and oxidation and/or decomposition of residues of the CO/HC-compounds, as well as the slip-catalyst's $SC_1$ deposition characteristics for the CO/HC-compounds, constitute a complement to the function of the first reduction catalyst $CR_1$. The combination of these characteristics for the first reduction catalyst device 331, comprising the first reduction catalyst $CR_1$ and the first slip-catalyst $SC_1$, means that a higher conversion level may be obtained over the first reduction catalyst device 331. In addition, the use of the first slip-catalyst $SC_1$ in the first reduction catalyst device 331 results in conditions making it possible to avoid that a non-selective oxidation of CO/HC-compounds occurs in components placed downstream of the first reduction catalyst device 331 in the exhaust treatment system.

The first catalytic reduction catalyst $CR_1$, and/or the first slip-catalyst $SC_1$, may be used with the objective of generating heat, for example through oxidation of hydrocarbons HC in the exhaust stream, which enables regeneration of sulphur contaminated components, such as the catalyst and/or components arranged downstream of the latter. At the regeneration of the sulphur contaminated components, the amount of sulphur intercalated in the components is reduced. The use of the first slip-catalyst $SC_1$, upstream of the first catalytic reduction catalyst $CR_1$, results in good possibilities for creating this heat.

In the configurations listed above according to the embodiments, the first reduction catalyst $CR_1$ and the first slip-catalyst $SC_1$ may consist of an integrated unit, comprising both $CR_1$ and $SC_1$, or may consist of separate units for $CR_1$ and $SC_1$.

Similarly, the first reduction catalyst device 331 and the particulate filter cDPF with an at least partly catalytically oxidizing coating may consist of an integrated unit, comprising both the first reduction catalyst device 331 and the particulate filter cDPF, or may consist of separate units for the first reduction catalyst device 331 and the filter cDPF.

Similarly, the second reduction catalyst $SCR_2$ and the second slip-catalyst $SC_2$ may either consist of an integrated unit, comprising both $SCR_2$ and $SC_2$, or may consist of separate units for $SCR_2$ and $SC_2$.

Similarly, the first slip-catalyst $SC_1$ and the particulate filter cDPF 320 with at least partly catalytically oxidizing coating may constitute at least partly integrated units, or comprise separate units.

The configurations according to the invention described above may, according to different embodiments of the present invention, also comprise a first oxidation catalyst $DOC_1$ 311, arranged upstream of the first reduction catalyst 331 to carry out a first oxidation of compounds comprising one or more of nitrogen, carbon and hydrogen in said exhaust stream 303, as described above. The configurations may then be described briefly as: $DOC_1$-$CR_1$-cDPF-$SCR_2$, $DOC_1$-$CR_1$-cDPF-$SCR_2$-$SC_2$, $DOC_1$-$CR_1$-$SC_1$-cDPF-$SCR_2$, $DOC_1$-$CR_1$-$SC_1$-cDPF-$SCR_2$-$SC_2$, $DOC_1$-$SC_1$-cDPF-$SCR_2$, $DOC_1$-$SC_1$-cDPF-$SCR_2$-$SC_2$, $DOC_1$-$SC_1$-$CR_1$-cDPF-$SCR_2$, $DOC_1$-$SC_1$-$CR_1$-cDPF-$SCR_2$-$SC_2$.

The configurations according to the invention described above may, according to different embodiments of the present invention, also comprise a second oxidation catalyst 312, arranged downstream of the first reduction catalyst 331 and upstream of an uncoated particulate filter DPF 320 to carry out a second oxidation of compounds comprising one or more of nitrogen, carbon and hydrogen in said exhaust stream 303, as described above. The configurations may then be briefly described as: $CR_1$-$DOC_2$-DPF-$SCR_2$, $CR_1$-$DOC_2$-DPF-$SCR_2$-$SC_2$, $CR_1$-$SC_1$-$DOC_2$-DPF-$SCR_2$, $CR_1$-$SC_1$-$DOC_2$-DPF-$SCR_2$-$SC_2$, $SC_1$-$DOC_2$-DPF-$SCR_2$, $SC_1$-$DOC_2$-DPF-$SCR_2$-$SC_2$, $SC_1$-$CR_1$-$DOC_2$-DPF-$SCR_2$, $SC_1$-$CR_1$-$DOC_2$-DPF-$SCR_2$-$SC_2$; and $DOC_1$-$CR_1$-$DOC_2$-DPF-$SCR_2$, $DOC_1$-$CR_1$-$DOC_2$-DPF-$SCR_2$-$SC_2$, $DOC_1$-$CR_1$-$SC_1$-$DOC_2$-DPF-$SCR_2$, $DOC_1$-$CR_1$-$SC_1$-$DOC_2$-DPF-$SCR_2$-$SC_2$, $DOC_1$-$SC_1$-$DOC_2$-DPF-$SCR_2$, $DOC_1$-$SC_1$-$DOC_2$-DPF-$SCR_2$-$SC_2$, $DOC_1$-$SC_1$-$CR_1$-$DOC_2$-DPF-$SCR_2$, $DOC_1$-$SC_1$-$CR_1$-$DOC_2$-DPF-$SCR_2$-$SC_2$, respectively.

The configurations according to the invention described above may, according to different embodiments of the present invention, also comprise a third oxidation catalyst 313, arranged downstream of a coated cDPF or non-coated particulate filter DPF 320 and upstream of the second reduction catalyst device 332 to carry out a second oxidation of compounds comprising one or several of nitrogen, carbon and hydrogen in said exhaust stream 303, as described above. The configurations may then be described briefly as $CR_1$-cDPF-$DOC_3$-$SCR_2$, $CR_1$-cDPF-$DOC_3$-$SCR_2$-$SC_2$, $CR_1$-$SC_1$-cDPF-$DOC_3$-$SCR_2$, $CR_1$-$SC_1$-cDPF-$DOC_3$-$SCR_2$-$SC_2$, $SC_1$-cDPF-$DOC_3$-$SCR_2$, $SC_1$-cDPF-$DOC_3$-$SCR_2$-$SC_2$, $SC_1$-$CR_1$-cDPF-$DOC_3$-$SCR_2$, $SC_1$-$CR_1$-cDPF-$DOC_3$-$SCR_2$-$SC_2$; and $DOC_1$-$CR_1$-cDPF-$DOC_3$-$SCR_2$, $DOC_1$-$CR_1$-cDPF-$DOC_3$-$SCR_2$-$SC_2$, $DOC_1$-$CR_1$-$SC_1$-cDPF-$DOC_3$-$SCR_2$, $DOC_1$-$CR_1$-$SC_1$-cDPF-$DOC_3$-$SCR_2$-$SC_2$, $DOC_1$-$SC_1$-cDPF-$DOC_3$-$SCR_2$, $DOC_1$-$SC_1$-cDPF-$DOC_3$-$SCR_2$-$SC_2$, $DOC_1$-$SC_1$-$CR_1$-cDPF-$DOC_3$-$SCR_2$, $DOC_1$-$SC_1$-$CR_1$-cDPF-$DOC_3$-$SCR_2$-$SC_2$; and $CR_1$-$DOC_2$-DPF-$DOC_3$-$SCR_2$, $CR_1$-$DOC_2$-DPF-$DOC_3$-$SCR_2$-$SC_2$, $CR_1$-$SC_1$-$DOC_2$-DPF-$DOC_3$-$SCR_2$, $CR_1$-$SC_1$-$DOC_2$-DPF-$DOC_3$-$SCR_2$-$SC_2$, $SC_1$-$DOC_2$-DPF-$DOC_3$-$SCR_2$, $SC_1$-$DOC_2$-DPF-$DOC_3$-$SCR_2$-$SC_2$, $SC_1$-$CR_1$-$DOC_2$-DPF-$DOC_3$-$SCR_2$, $SC_1$-$CR_1$-$DOC_2$-DPF-$DOC_3$-$SCR_2$-$SC_2$; and $DOC_1$-$CR_1$-$DOC_2$-DPF-$DOC_3$-$SCR_2$, $DOC_1$-$CR_1$-$DOC_2$-DPF-$DOC_3$-$SCR_2$-$SC_2$, $DOC_1$-$CR_1$-$SC_1$-$DOC_2$-DPF-$DOC_3$-$SCR_2$, $DOC_1$-$CR_1$-$SC_1$-$DOC_2$-DPF-$DOC_3$-$SCR_2$-$SC_2$, $DOC_1$-$SC_1$-$DOC_2$-DPF-$DOC_3$-$SCR_2$, $DOC_1$-$SC_1$-$DOC_2$-DPF-$DOC_3$-$SCR_2$-$SC_2$, $DOC_1$-$SC_1$-$CR_1$-$DOC_2$-DPF-$DOC_3$-$SCR_2$, $DOC_1$-$SC_1$-$CR_1$-$DOC_2$-DPF-$DOC_3$-$SCR_2$-$SC_2$, respectively.

Those of the above described configurations according to the invention which do not comprise a second oxidation catalyst $DOC_2$ may also, according to different embodiments of the present invention, comprise a non-coated particulate filter DPF 320. The configurations may then be described briefly as $CR_1$-DPF-$SCR_2$, $CR_1$-DPF-$SCR_2$-$SC_2$, $CR_1$-$SC_1$-DPF-$SCR_2$, $CR_1$-$SC_1$-DPF-$SCR_2$-$SC_2$, $SC_1$-DPF-$SCR_2$, $SC_1$-DPF-$SCR_2$-$SC_2$, $SC_1$-$CR_1$-DPF-$SCR_2$, $SC_1$-$CR_1$-DPF-$SCR_2$-$SC_2$; and $DOC_1$-$CR_1$-DPF-$SCR_2$, $DOC_1$-$CR_1$-DPF-$SCR_2$-$SC_2$, $DOC_1$-$CR_1$-$SC_1$-DPF-$SCR_2$, $DOC_1$-$CR_1$-$SC_1$-DPF-$SCR_2$-$SC_2$, $DOC_1$-$SC_1$-DPF-$SCR_2$, $DOC_1$-$SC_1$-DPF-$SCR_2$-$SC_2$, $DOC_1$-$SC_1$-$CR_1$-DPF-$SCR_2$, $DOC_1$-$SC_1$-$CR_1$-DPF-$SCR_2$-$SC_2$; and $CR_1$-DPF-$DOC_3$-$SCR_2$, $CR_1$-DPF-$DOC_3$-$SCR_2$-$SC_2$, $CR_1$-$SC_1$-DPF-$DOC_3$-$SCR_2$, $CR_1$-$SC_1$-DPF-$DOC_3$-$SCR_2$-$SC_2$, $SC_1$-DPF-$DOC_3$-$SCR_2$, $SC_1$-DPF-$DOC_3$-$SCR_2$-$SC_2$, $SC_1$-$CR_1$-DPF-$DOC_3$-$SCR_2$, $SC_1$-$CR_1$-DPF-$DOC_3$-$SCR_2$-$SC_2$; and $DOC_1$-$CR_1$-DPF-$DOC_3$-$SCR_2$, $DOC_1$-$CR_1$-DPF-$DOC_3$-$SCR_2$-$SC_2$, $DOC_1$-$CR_1$-$SC_1$-DPF-$DOC_3$-$SCR_2$, $DOC_1$-$CR_1$-$SC_1$-DPF-$DOC_3$-$SCR_2$-$SC_2$, $DOC_1$-$SC_1$-DPF-$DOC_3$-$SCR_2$, $DOC_1$-$SC_1$-DPF-$DOC_3$-$SCR_2$-$SC_2$, $DOC_1$-$SC_1$-$CR_1$-DPF-$DOC_3$-$SCR_2$, $DOC_1$-$SC_1$-$CR_1$-DPF-$DOC_3$-$SCR_2$-$SC_2$, respectively.

As described in detail above, each one of the configurations of the invention listed above may comprise a second dosage device 371 upstream of the second reduction catalyst device 332, and may or may not comprise a first dosage device 371 upstream of the first reduction catalyst device 331.

According to one aspect of the present invention, a method is provided for the treatment of an exhaust stream 303, which is emitted by a combustion engine 301. This method is described herein with the help of FIG. 4, in which the method steps follow the flow of the exhaust stream through the exhaust treatment system 350.

In a first step 410 of the method, a reduction of nitrogen oxides $NO_x$ in the exhaust stream is carried out, with the use of compounds comprising one or several of carbon monoxide CO and hydrocarbons HC present in the exhaust stream 303, in a first reduction catalyst device 331. The first reduction catalyst device 331 may according to different embodiments comprise a first catalytic reduction catalyst $CR_1$, and/or a first slip-catalyst $SC_1$. The first slip-catalyst $SC_1$ is arranged to oxidize and/or disintegrate CO/HC-compounds, and/or gives an additional reduction of nitrogen oxides $NO_x$ in the exhaust stream 303. It should be noted that the reduction of nitrogen oxides $NO_x$ with the first reduction catalyst device 331 in this document may comprise partial oxidation, as long as the total reaction constitutes a reduction of nitrogen oxides $NO_x$.

In a second step 420 of the method, the exhaust stream is filtered, so that soot particles are caught up and oxidized by a particulate filter 320. According to various embodiments, the particulate filter 320 may consist of a traditional non-coated particulate filter DPF, or a particulate filter cDPF, which at least partly comprises catalytically oxidizing coating, wherein such catalytically oxidizing coating oxidizes the caught soot particles, and one or several incompletely oxidized nitrogen and/or carbon compounds.

In a third step 430 of the method, a supply of an additive to the exhaust stream 303 is controlled with the use of a second dosage device 372.

In a fourth step 440 of the method, a reduction of the nitrogen oxides $NO_x$ in the exhaust stream 303 is carried out, through the use of at least the additive in a second reduction catalyst device 332, which may comprise a second selective catalytic reduction catalyst $SCR_2$, and in some configurations a second slip-catalyst $SC_2$, arranged downstream of the second dosage device 371. The reduction in the second reduction catalyst 332 is here impacted by the supply of additive in the third step 430. The second slip-catalyst $SC_2$ here oxidizes a surplus of additive, such as ammonia, and/or provides an additional reduction of nitrogen oxides $NO_x$ in the exhaust stream 303. It should be noted that the reduction of nitrogen oxides $NO_x$ with the second reduction catalyst device 332 in this document may comprise partial oxidation, as long as the total reaction constitutes a reduction of nitrogen oxides $NO_x$.

It may be noted that a first temperature T1, which the first reduction catalyst device 331 is exposed to, and a second temperature T2, which the second reduction catalyst device 332 is exposed to, is very significant to the function of the exhaust treatment system 350. However, it is difficult to control these temperatures T1, T2, since they to a great extent depend on how the driver drives the vehicle, that is to say that the first T1 and second T2 temperatures depend on the current operation of the vehicle, and inputs via, for example, the accelerator pedal in the vehicle.

The method for exhaust treatment, and the exhaust treatment system 350 itself, become considerably more efficient than a traditional system (as displayed in FIG. 2) by way of the first temperature T1 for the first reduction catalyst device 331 reaching, at for example starting processes, higher values for the first temperature T1 faster, and therefore achieving a higher efficiency at the reduction of nitrogen oxides $NO_x$, through the method according to the present invention. Accordingly, a more efficient reduction of nitrogen oxides $NO_x$ is obtained, for example at cold starts and increased power output from low exhaust temperatures, resulting in a smaller increase of fuel consumption in such driving modes. In other words, the present invention utilizes the first T1 and second T2 temperatures, which are difficult to control, to its advantage, so that they contribute to increasing the overall efficiency of the exhaust purification system.

The above mentioned advantages for the exhaust treatment system 350 are also obtained for the method according to the present invention.

According to one embodiment of the present invention, an emission 401 of compounds comprising one or several of carbon monoxide CO and hydrocarbons HC into the exhaust stream 303, is controlled from the combustion engine 301. For this embodiment, the reduction 410 of nitrogen oxides $NO_x$ in the exhaust stream 303 with the use of the first reduction catalyst device 331, uses these compounds comprising one or several of carbon monoxide CO and hydrocarbons HC released into the exhaust stream 303. According to this embodiment of the present invention, one or several control signals are provided, which may be used at the control of the combustion engine 301, in order for a desired amount of compounds comprising one or more of carbon monoxide CO and hydrocarbons HC to be released to the exhaust stream 303 from the combustion engine 301. Thus, no dosage device is required upstream of the first reduction catalyst device to achieve a reduction in the first reduction catalyst device.

According to one embodiment of the present invention, one or several control signals are also provided, which may be used to control the combustion engine 301 in such a manner that heat for heating the first reduction catalyst device 331 is created to such an extent, that the first reduction catalyst device 331 reaches a predetermined temperature suitable for its function.

According to one embodiment of the present invention, a supply 402 of compounds comprising one or more of carbon monoxide CO and hydrocarbons HC to the exhaust stream 303 is controlled with the use of a first dosage device 371, arranged downstream of the combustion engine 301 and upstream of the first reduction catalyst device 331. For this embodiment the reduction of nitrogen oxides $NO_x$ in the exhaust stream 303 uses these supplied compounds in the first method step 410. Thus, the first reduction catalyst 331 uses one or more of the supplied compounds comprising carbon monoxide CO and/or hydrocarbons HC. According to this embodiment, the exhaust treatment system 350 thus comprises a first dosage device 371. One or more control signals, which may be used to control the supply of carbon monoxide and/or hydrocarbon compounds with the first dosage device 371, are provided here.

According to one embodiment of the present invention, one or more control signals are provided, which may be used to control both emissions from the engine 301 and supply with a first dosage device 371. Thus, an emission 401 of compounds comprising one or more of carbon monoxide CO and hydrocarbons HC into the exhaust stream 303 is controlled from the combustion engine 301. Also, a supply 402 of compounds comprising one or more of carbon monoxide CO and hydrocarbons HC to the exhaust stream 303 is controlled with the use of a first dosage device 371, arranged downstream of the combustion engine 301 and upstream of the first reduction catalyst device 331. The reduction 410 of nitrogen oxides $NO_x$ in the exhaust stream 303 with the first reduction catalyst device 331 occurs with the use of one or more of these supplied compounds and these emitted compounds. The supplied compounds and the emitted compounds here comprise, as described above, one or more of carbon monoxide CO and hydrocarbons HC.

According to the embodiments of the present invention described above, the supply 402 is provided by one or more control signals, which may be used to control the combustion engine 301 in order to obtain a desired emitted amount of compounds comprising carbon monoxide CO and/or hydrocarbons HC in the exhaust stream, or to obtain heat for heating of the first reduction catalyst device. These one or more control signals may here be created by the control device 360 and provided to the engine 301, as illustrated in FIGS. 3*a*-*b*.

Similarly, the control device 360 may create the above mentioned one or more control signals, in order to control the supply of compounds comprising carbon monoxide CO and/or hydrocarbons HC to the exhaust stream, and to provide them to the dosage control device 374, as illustrated in FIG. 3*b*.

As mentioned above, according to one embodiment of the present invention, the first slip-catalyst $SC_1$ may be a multifunctional slip-catalyst, which both reduces nitrogen oxides $NO_x$, and oxidizes residues of CO/HC-compounds, for example by way of primarily reducing nitrogen oxides $NO_x$, and secondarily oxidizing residues of CO/HC-compounds. To obtain these characteristics, the first slip-catalyst $SC_1$ according to the embodiment may comprise one or more substances comprised in the platinum metal group and/or silver Ag.

Such a multifunctional first slip-catalyst $SC_1$, comprised in the first reduction catalyst device 331, may, according to one embodiment of the invention, constitute the first reduction catalyst device 331 on its own, meaning that the first reduction catalyst device 331 consists only of the multifunctional slip-catalyst $SC_1$.

Such a multifunctional first slip-catalyst $SC_1$, comprised in the first reduction catalyst device 331, may, according to another embodiment of the invention, constitute the first reduction catalyst device 331 in combination with a first reduction catalyst $CR_1$, meaning that the first reduction catalyst device 331 consists of the first reduction catalyst $CR_1$, and the multifunctional first slip-catalyst $SC_1$.

As mentioned above, according to one embodiment of the present invention, the second slip-catalyst $SC_2$ may be a multifunctional slip-catalyst, which both reduces nitrogen oxides $NO_x$, and oxidizes residues of additive, for example by way of primarily reducing nitrogen oxides $NO_x$, and secondarily oxidizing residues of additive.

In order to obtain these characteristics, the second slip-catalyst $SC_2$ may, according to one embodiment, comprise one or several substances comprised in platinum metals, and/or one or several other substances that provide the slip-catalyst with similar characteristics as the platinum metal group.

For the second slip-catalyst $SC_2$ in the second reduction catalyst device 332, often substantially only oxidation of residues of additive having passed through the second reduction catalyst $SCR_2$ is obtained, since only low levels of nitrogen oxides $NO_x$ are available in the exhaust stream 303 at this point.

The multifunctional second slip-catalyst $SC_2$ 600, according to one embodiment, comprises at least two active layers/strata arranged on at least one stabilizing layer/stratum 601, which is schematically illustrated in FIG. 6. It should be noted that the embodiment displayed in FIG. 6 only is an example of a possible design of a multifunctional second slip-catalyst $SC_2$. A multifunctional second slip-catalyst $SC_2$ may be adapted in a number of other ways, as long as the above described reactions are achieved by the multifunctional second slip-catalyst $SC_2$. Accordingly, a number of designs, apart from the one displayed in FIG. 6, of the multifunctional second slip-catalyst $SC_2$, which result in an oxidation of additive and a reduction of nitrogen oxides $NO_x$, may be used for the multifunctional second slip-catalyst $SC_2$.

The first layer 602 of these active layers comprises for the second slip-catalyst $SC_2$ one or several substances, comprised in the platinum metals, or one or several other substances, which provide the slip-catalyst with similar characteristics as does the platinum metal group, that is to say for example oxidation of ammonia. The second layer 603 may comprise an $NO_x$-reducing coating, for example comprising Cu- or Fe-zeolite or vanadium. Zeolite is here activated with an active metal, such as for example copper (Cu) or iron (Fe). The second layer 603 is here in direct contact with the exhaust stream 303 that passes through the exhaust treatment system.

According to one embodiment of the present invention, the first reduction catalyst device 331, that is to say the first slip-catalyst $SC_1$, and/or the first reduction catalyst $CR_1$, may thus be used for oxidation of hydrocarbons HC and/or carbon monoxide CO, which occur naturally or are created in/introduced into the exhaust stream. For example, hydrocarbons HC in the exhaust stream 303 may be comprised in fuel residues from the combustion in the combustion engine 101, and/or from extra injections of fuel in connection with regeneration of the particulate filter DPF/cDPF.

The oxidation of hydrocarbons HC in the first reduction catalyst device 331 may also comprise at least one exothermic reaction, that is to say a reaction which generates heat, so that a temperature increase ensues for the first reduction catalyst device 331, and/or for components following downstream, such as the particulate filter DPF/cDPF 320 and/or a silencer, in the exhaust treatment system 350. Such temperature increase may be used at soot oxidation in the particulate filter DPF/cDPF 320, and/or to clean the silencer of by-products, such as for example urea. Through this at least one exothermic reaction, oxidation of hydrocarbons HC is also facilitated in the first reduction catalyst device 331. Additionally, the CR-layer in the first slip-catalyst $SC_1$ may be deactivated over time by for example sulphur, which means that a heat generating exothermic reaction may be needed, in order to secure the function of the first slip-catalyst $SC_1$ through a regeneration. Similarly, a heat generating exothermic reaction may be used in order to secure the function of a first reduction catalyst $CR_1$ through a regeneration. As mentioned above, the regeneration reduces the amount of sulphur in the catalyst/component which is regenerated.

The characteristics listed above and the advantages specified for a first multifunctional slip-catalyst $SC_1$ in the first reduction catalyst device 331, may be made to function very well for an exhaust treatment system 350 as described above, that is to say with a first reduction catalyst device 331, followed downstream by a particulate filter 320, which according to one embodiment may be partly coated with a catalytic coating, followed downstream by a second reduction catalyst device 332.

According to one embodiment of the method according to the present invention, the reduction is controlled with the first reduction catalyst device 331, so that it occurs within a reduction temperature interval $T_{red}$, which at least partly differs from an oxidation temperature interval $T_{ox}$, within which a significant soot oxidation in the particulate filter 320 occurs, $T_{red} \neq T_{ox}$, so that the reduction of nitrogen oxides $NO_x$ in the first reduction catalyst device does not compete significantly with the nitrogen dioxide based soot oxidation in the particulate filter DPF/cDPF.

According to one embodiment of the method, the first reduction catalyst device 331 is optimized based on characteristics, such as catalytic characteristics, for the first 331 and/or the second 332 reduction catalyst device. Additionally, the second reduction catalyst device 332 may be optimized based on characteristics, such as catalytic characteristics, for the first 331 and/or the second 332 reduction catalyst device. These possibilities of optimizing the first reduction catalyst device, and/or the second reduction catalyst device, result in an overall efficient exhaust purification, which better reflects the conditions of the complete exhaust treatment system.

The above mentioned characteristics for the first 331, and/or second 332 reduction catalyst device, may be related to one or more catalytic characteristics for the first 331, and/or the second 332 reduction catalyst device, a catalyst type for the first 331 and/or the second 332 reduction catalyst device, a temperature interval, within which the first 331 and/or the second 332 reduction catalyst device is active, and a coverage of CO/HC and ammonia, respectively, for the first 331 and/or the second 332 reduction catalyst device, respectively.

According to one embodiment of the present invention, the first reduction catalyst device 331, and the second reduction catalyst device 332, respectively, are optimized based on operating conditions for the first 331 and the second 332 reduction catalyst device, respectively. These operating conditions may be related to a temperature, that is to say a static temperature, for the first 331 and the second 332 reduction catalyst device, respectively, and/or to a temperature trend, that is to say to a change of the temperature, for the first 331 and the second 332 reduction catalyst device, respectively.

According to one embodiment of the method according to the present invention, an active control is carried out of the reduction implemented by the first reduction catalyst device 331, based on a relationship between the amount of nitrogen dioxide $NO_{2\_2}$ and the amount of nitrogen oxides $NO_{x\_2}$ that reach the second reduction catalyst device 332. In other words, the ratio $NO_{2\_2}/NO_{x\_2}$ is controlled, so that it has a suitable value for the reduction in the second reduction catalyst device 332, through which a more efficient reduction may be obtained. In further detail, herein the first reduction catalyst device 331 thus carries out a first reduction of a first amount of nitrogen oxides $NO_{x\_1}$, which reaches the first reduction catalyst device 331. At the second reduction catalyst device 332, a second reduction of a second amount of nitrogen oxides $NO_{x\_2}$ is carried out, reaching the second reduction catalyst device 332, wherein an adaptation is carried out of the ratio $NO_{2\_2}/NO_{x\_2}$, between the amount of nitrogen dioxide $NO_{2\_2}$ and the second amount of nitrogen oxides $NO_{x\_2}$, reaching the second reduction catalyst device 332. This adaptation is carried out herein with the use of an active control of the first reduction, based on a determined value $(NO_{2\_2}/NO_{x\_2})_{det}$ for the ratio $NO_{2\_2}/NO_{x\_2}$, the intention being that the ratio $NO_{2\_2}/NO_{x\_2}$ should have a value making the second reduction more efficient. The value $(NO_{2\_2}/N)_{x\_2})_{det}$ for the ratio $NO_{2\_2}/NO_{x\_2}$ may herein consist of a measured value, a modelled value and/or a predicted value. A predicted value may here be determined based on a representation of a road section ahead of the vehicle. This representation may be based, for example, on positioning information, such as GPS-information, and map data.

According to one embodiment of the method according to the present invention, a first oxidation of compounds comprising one or more of nitrogen, carbon and hydrogen is carried out in the exhaust stream 303. This first oxidation is then carried out by a first oxidation catalyst 311, arranged upstream of the first reduction catalyst 332.

According to one embodiment of the method according to the present invention, a second oxidation of compounds comprising one or more of nitrogen, carbon and hydrogen is carried out in the exhaust stream 303. This second oxidation is then carried out by a second oxidation catalyst 312, arranged downstream of the first reduction catalyst 332 and upstream of the particulate filter 320, which may in this case be a non-coated particulate filter DPF.

According to one embodiment of the method according to the present invention, a third oxidation of compounds comprising one or more of nitrogen, carbon and hydrogen is carried out in the exhaust stream 303. This third oxidation is then carried out by a third oxidation catalyst 313, arranged downstream of the particulate filter 320 and upstream of the second reduction catalyst device.

According to one embodiment of the present invention, the particulate filter cDPF 320 comprises at least partly a catalytically oxidizing coating, arranged to oxidize one or more of nitrogen monoxide NO and incompletely oxidized carbon compounds in the exhaust stream.

According to one embodiment of the present invention, the reduction 410 is controlled with the first reduction catalyst device 331 in such a manner, that a slip $HC/CO_{slip}$ of compounds containing carbon monoxide CO and/or hydrocarbons HC from the reduction catalyst device 331 is lower than or equal to a slip-threshold $HC/CO_{slip\_threshold}$; $HC/CO_{slip} \leq HC/CO_{slip\_threshold}$. This slip threshold value $HC/CO_{slip\_threshold}$ may for example have a value of 500 ppm, 100 ppm, 50 ppm, or 10 ppm of the compounds comprising carbon monoxide CO and/or hydrocarbons HC. The slip $HC/CO_{slip}$ of compounds may here equal the amount of either of carbon monoxide CO and hydrocarbons HC emitted from the reduction catalyst device 331, or the total amount of carbon monoxide CO and hydrocarbons HC.

To be able to control the reduction 410 with the first reduction catalyst device 331, so that the slip $HC/CO_{slip}$ of carbon monoxide CO and/or hydrocarbons HC is limited, entails advantages for components arranged downstream of the first reduction catalyst device 331 in the exhaust treatment system. If, for example, a particulate filter DPF 320 and a second reduction catalyst device 332 are arranged downstream of the first reduction catalyst device 331, there is a risk that the slip $HC/CO_{slip}$ may pass straight through the particulate filter 320 and reach the second reduction catalyst device 332. The function of the second reduction catalyst device 332 may then be negatively impacted by this slip $HC/CO_{slip}$. Thus, an efficient reduction of nitrogen oxides $NO_x$ in the second reduction catalyst device 332 may be provided by this embodiment of the present invention, since the slip $HC/CO_{slip}$ is limited.

If, for example, a particulate filter cDPF 320, at least partly comprising a catalytically oxidizing coating arranged to oxidize one or more of nitrogen monoxide NO and incompletely oxidized carbon compounds in the exhaust stream, is arranged downstream of the first reduction catalyst device 331, there is a risk that the slip $HC/CO_{slip}$ may limit the soot oxidation in the filter cDPF, because the filter cDPF then becomes busy oxidizing the slip $HC/CO_{slip}$ instead of creating nitrogen monoxide $NO_2$. Thus, an efficient soot oxidation in the filter cDPF is provided by this embodiment of the present invention, since the slip $HC/CO_{slip}$ is limited.

According to one embodiment of the present invention, the reduction 410 is controlled with the first reduction catalyst device 331 in such a manner, that a slip $NH_{3\_slip}$ of ammonia from the first reduction catalyst device 331 is lower than or equal to an ammonia slip-threshold $NH_{3\_slip}$ threshold; $NH_3$ slip $NH_{3\_slip\_threshold}$. The ammonia slip threshold value $NH_{3\_slip}$ threshold may here for example have a value of 100 ppm, 50 ppm, 20 ppm, 10 ppm, 5 ppm or 0 ppm ammonia $NH_3$. Under certain circumstances, the first reduction catalyst device 331 may create low levels of ammonia $NH_3$ as a bi-product at the reduction of nitrogen oxides NOx with carbon monoxide CO and/or hydrocarbons HC. By limiting the ammonia slip $NH_{3\_slip}$ emitted from the first reduction catalyst device 331, a more efficient soot oxidation may be achieved in a particulate filter DPF, arranged downstream of the first reduction catalyst device 331. If instead a particulate filter cDPF 320, at least partly comprising a catalytically oxidizing coating arranged to oxidize one or more of nitrogen monoxide NO and incompletely oxidized carbon compounds in the exhaust stream, is arranged downstream of the first reduction catalyst device 331, there is a risk that the ammonia slip $NH_{3\_slip}$ may be converted into one or more unwanted compounds, such as laughing gas, and/or that it may lead to an unwanted recreation of nitrogen monoxide NOx in the filter cDPF.

The control of the reduction 410, which is done at least partly with the objective of limiting the above mentioned slip $HC/CO_{slip}$, $NH_{3\_slip}$ of various types, may comprise a control of an emission 401 of compounds comprising carbon monoxide CO and/or hydrocarbons HC into the exhaust stream 303 from the combustion engine 301, and/or a control of a supply 402 of compounds comprising carbon monoxide CO and/or hydrocarbons HC to the exhaust stream 303 with the use of a first dosage device 371, arranged upstream of the first reduction catalyst device 331. The control of the combustion engine 301, and/or supply of carbon monoxide CO and/or hydrocarbons HC, with the first dosage device 371 is thus controlled to achieve that the slip $HC/CO_{slip}$, $NH_{3\_slip}$ emitted from the first reduction catalyst device is lower than the respective threshold value $HC/CO_{slip}$ threshold, $NH_{3\_slip\_threshold}$.

A person skilled in the art will realize that a method for treatment of an exhaust stream according to the present invention may also be implemented in a computer program, which when executed in a computer will cause the computer to execute the method. The computer program usually forms a part of a computer program product 503, wherein the computer program product comprises a suitable digital non-volatile/permanent/persistent/durable storage medium on which the computer program is stored. Said non-volatile/permanent/persistent/durable computer readable medium consists of a suitable memory, e.g.: ROM (Read-Only Memory), PROM (Programmable Read-Only Memory), EPROM (Erasable PROM), Flash, EEPROM (Electrically Erasable PROM), a hard disk device, etc.

FIG. 5 schematically shows a control device 500. The control device 500 comprises a calculation unit 501, which may consist of essentially a suitable type of processor or microcomputer, e.g. a circuit for digital signal processing (Digital Signal Processor, DSP), or a circuit with a predetermined specific function (Application Specific Integrated Circuit, ASIC). The calculation unit 501 is connected to a memory unit 502, installed in the control device 500, providing the calculation device 501 with e.g. the stored program code and/or the stored data, which the calculation device 501 needs in order to be able to carry out calculations. The calculation unit 501 is also set up to store interim or final results of calculations in the memory unit 502.

Further, the control device 500 is equipped with devices 511, 512, 513, 514 for receiving and sending of input and output signals, respectively. These input and output signals may contain wave shapes, pulses, or other attributes, which may be detected as information by the devices 511, 513 for the receipt of input signals, and may be converted into signals that may be processed by the calculation unit 501. These signals are then provided to the calculation unit 501. The devices 512, 514 for sending output signals are arranged to convert the calculation result from the calculation unit 501 into output signals for transfer to other parts of the vehicle's control system, and/or the component(s) for which the signals are intended.

Each one of the connections to the devices for receiving and sending of input and output signals may consist of one or several of a cable; a data bus, such as a CAN (Controller Area Network) bus, a MOST (Media Oriented Systems Transport) bus, or any other bus configuration; or of a wireless connection.

A person skilled in the art will realize that the above-mentioned computer may consist of the calculation unit 501, and that the above-mentioned memory may consist of the memory unit 502.

Generally, control systems in modern vehicles consist of a communications bus system, consisting of one or several communications buses to connect a number of electronic control devices (ECUs), or controllers, and different components localized on the vehicle. Such a control system may comprise a large number of control devices, and the responsibility for a specific function may be distributed among more than one control device. Vehicles of the type shown thus often comprise significantly more control devices than what is shown in FIG. 5, which is well known to a person skilled in the art within the technology area.

As a person skilled in the art will realize, the control device 500 in FIG. 5 may comprise one or more of the control devices 115 and 160 in FIG. 1, the control device 260 in FIG. 2, the control device 360 in FIGS. 3*a-b* and the control device 374 in FIGS. 3*a-b*.

The present invention, in the embodiment displayed, is implemented in the control device 500. The invention may, however, also be implemented wholly or partly in one or several other control devices, already existing in the vehicle, or in a control device dedicated to the present invention.

In this document, devices, such as control devices, are often described as being arranged to carry out steps in the method according to the invention. This also comprises that the devices are adapted and/or set up to carry out these method steps. For example, these units may correspond to different groups of instructions, for example in the form of program code, which is fed into, and used by a processor, when the respective unit is active/used to implement the respective method steps.

A person skilled in the art will also realize that the above exhaust treatment system may be modified according to the different embodiments of the method according to the invention. In addition, the invention relates to the motor vehicle 100, for example a car, a truck or a bus, or another unit comprising at least one exhaust treatment system according to the invention, such as for example a vessel or a voltage/current-generator.

The present invention is not limited to the embodiments of the invention described above, but relates to and comprises all embodiments within the scope of the enclosed independent claims.

The invention claimed is:

1. An exhaust treatment system arranged for the treatment of an exhaust stream resulting from a combustion in a combustion engine, said system comprising:
    a first reduction catalyst device, arranged for reduction of nitrogen oxides $NO_x$ in said exhaust stream through the use of compounds comprising one or more of carbon monoxide CO and hydrocarbons HC, which are comprised in said exhaust stream when said exhaust stream reaches said first reduction catalyst device, wherein said first reduction catalyst device comprises a first catalytic reduction catalyst and a first slip-catalyst, wherein said first slip-catalyst is arranged to oxidize and/or disintegrate said compounds comprised in said exhaust stream, which, in turn, said compounds assist said first catalytic reduction catalyst with a further reduction of nitrogen oxides $NO_x$ in said exhaust stream and/or to create an exothermic reaction;
    a particulate filter, arranged downstream of said first reduction catalyst device to catch and oxidize soot particles in said exhaust stream;
    a second dosage device, arranged downstream of said particulate filter and arranged to supply an additive, which comprises ammonia or a substance from which ammonia may be extracted and/or released into said exhaust stream; and
    a second reduction catalyst device, arranged downstream of said second dosage device and arranged for reduction of nitrogen oxides $NO_x$ in said exhaust stream through the use of said additive.

2. The exhaust treatment system according to claim 1, wherein:
    said internal combustion engine is arranged to emit compounds comprising one or more of carbon monoxide CO and hydrocarbons HC into said exhaust stream; and
    said first reduction catalyst device is arranged for reduction of nitrogen oxides $NO_x$ in said exhaust stream, through the use of at least said emitted compounds comprising one or more of carbon monoxide CO and hydrocarbons HC in said exhaust stream.

3. The exhaust treatment system according to claim 1, wherein:
    a first dosage device is arranged downstream of said combustion engine and upstream of said first reduction catalyst device, and is arranged to supply compounds comprising one or more of carbon monoxide CO and hydrocarbons HC to said exhaust stream; and said first reduction catalyst device is arranged for reduction of nitrogen oxides $NO_x$ in said exhaust stream, through the use of at least said supplied compounds comprising one or more of carbon monoxide CO and hydrocarbons HC in said exhaust stream.

4. The exhaust treatment system according to claim 1, wherein:

said internal combustion engine is arranged to emit compounds comprising one or more of carbon monoxide CO and hydrocarbons HC into said exhaust stream;

a first dosage device is arranged downstream of said combustion engine and upstream of said first reduction catalyst device, and is arranged to supply compounds comprising one or more of carbon monoxide CO and hydrocarbons HC to said exhaust stream; and said first reduction catalyst device is arranged for reduction of nitrogen oxides $NO_x$ in said exhaust stream, through the use of one or more of said supplied compounds and said emitted compounds, wherein said supplied compounds and said emitted compounds comprise one or more of carbon monoxide CO and hydrocarbons HC.

5. The exhaust treatment system according to claim 1, comprising:

a control device (360), arranged to provide one or several control signals, which may be used to control said combustion engine in such a manner that a desired amount of said compounds comprising one or more of carbon monoxide CO and hydrocarbons HC is emitted from said internal combustion engine.

6. The exhaust treatment system according to claim 1, wherein either said first catalytic reduction catalyst is followed downstream by said first slip-catalyst, or said first slip-catalyst is followed downstream by said first catalytic reduction catalyst.

7. The exhaust treatment system according to claim 1, wherein said second reduction catalyst device comprises one from among the group of:

a second selective catalytic reduction catalyst ($SCR_2$); and a second selective catalytic reduction catalyst ($SCR_2$) followed downstream by a second slip-catalyst ($SC_2$), wherein said second slip-catalyst ($SC_2$) is arranged to oxidize a residue of additive, and/or to assist said second selective catalytic reduction catalyst ($SCR_2$) with an additional reduction of nitrogen oxides $NO_x$ in said exhaust stream.

8. The exhaust treatment system according to claim 1, wherein said exhaust treatment system comprises a system for supply of one or more of said compounds comprising one or more of carbon monoxide CO, hydrocarbons HC and said additive, wherein said system comprises at least one pump, arranged to supply said first and second dosage devices with said compounds comprising one or more of carbon monoxide CO, hydrocarbons HC and said additive, respectively.

9. The exhaust treatment system according to claim 8, wherein said system for supply of one or more of said compounds comprising one or more of carbon monoxide CO, hydrocarbons HC and said additive comprises a dosage control device, arranged to control said at least one pump.

10. The exhaust treatment system according to claim 8, wherein said system for supply of one or more of said compounds comprising one or more of carbon monoxide CO, hydrocarbons HC and said additive comprises a dosage control device comprising:

a first pump control device, arranged to control said at least one pump, wherein a first administration of said compounds comprising one or more of carbon monoxide CO and hydrocarbons HC is supplied to said exhaust stream with the use of said first dosage device; and a second pump control device, arranged to control said at least one pump, wherein a second administration of said additive is supplied to said exhaust stream with the use of said second dosage device.

11. The exhaust treatment system according to claim 1, wherein said first reduction catalyst device is arranged for the reduction of said nitrogen oxides $NO_x$ within a reduction temperature interval $T_{red}$, which at least partly differs from an oxidation temperature interval $T_{ox}$, within which said particulate filter is arranged for oxidation of incompletely oxidized carbon compounds; $T_{red} \neq T_{ox}$.

12. The exhaust treatment system according to claim 1, also comprising:

a first oxidation catalyst arranged upstream of said first reduction catalyst for a first oxidation and/or decomposition of compounds comprising one or more of nitrogen, carbon and hydrogen in said exhaust stream, and/or to create an exothermic reaction.

13. The exhaust treatment system according to claim 1, wherein said particulate filter at least partly comprises a catalytically oxidizing coating, arranged to oxidize one or more of nitrogen oxide NO and incompletely oxidized carbon compounds.

14. The exhaust treatment system according to claim 1, wherein said particulate filter at least partly comprises a catalytically oxidizing coating, arranged for reduction of nitrogen oxides $NO_x$.

15. The exhaust treatment system according to claim 1, also comprising a second oxidation catalyst, arranged downstream of said first reduction catalyst device and upstream of said particulate filter, in order to carry out a second oxidation and/or decomposition of compounds comprising one or more of nitrogen, carbon and hydrogen in said exhaust stream, and/or to create an exothermic reaction.

16. The exhaust treatment system according to claim 1, also comprising a third oxidation catalyst, arranged downstream of said particulate filter and upstream of said second reduction catalyst device, in order to carry out a third oxidation and/or decomposition of compounds comprising one or more of nitrogen, carbon and hydrogen in said exhaust stream, and/or to create an exothermic reaction.

17. The exhaust treatment system according to claim 1, also comprising:

a control device, arranged to provide one or several control signals, which may be used to control said reduction with said first reduction catalyst device, in such a manner that a slip HC/$CO_{slip}$ of said compounds emitted from said reduction catalyst device is lower than or equal to a slip threshold value HC/$CO_{slip\_threshold}$; HC/$CO_{slip} \leq$ HC/$CO_{slip\_threshold}$.

18. The exhaust treatment system according to claim 17, wherein said control of said reduction comprises a control of one or more of:

an emission of compounds comprising one or more of carbon monoxide CO and hydrocarbons HC into said exhaust stream from said combustion engine; and a supply of compounds comprising one or more of carbon monoxide CO and hydrocarbons HC into said exhaust stream, with the use of a first dosage device arranged downstream of said combustion engine and upstream of said first reduction catalyst device.

19. The exhaust treatment system according to claim 17, wherein said slip threshold value $HC/CO_{slip\_threshold}$ has a value in the group of:
- 500 ppm of said compounds;
- 100 ppm of said compounds;
- 50 ppm of said compounds; and
- 10 ppm of said compounds.

20. The exhaust treatment system according to claim 1, also comprising:
a control device, arranged to provide one or several control signals, which may be used to control said reduction with said first reduction catalyst device, in such a manner that a slip $NH_{3\_slip}$ of ammonia emitted from said reduction catalyst device is lower than or equal to an ammonia slip threshold value $NH_{3\_slip\_threshold}$; $NH_{3\_slip} \leq NH_{3\_slip\_threshold}$.

21. The exhaust treatment system according to claim 20, wherein said control of said reduction comprises a control of one or more of:
an emission of compounds comprising one or more of carbon monoxide CO and hydrocarbons HC into said exhaust stream from said combustion engine; and
a supply of compounds comprising one or more of carbon monoxide CO and hydrocarbons HC into said exhaust stream, with the use of a first dosage device arranged downstream of said combustion engine and upstream of said first reduction catalyst device.

22. The exhaust treatment system according to claim 20, wherein said ammonia slip threshold value $NH_{3\_slip\_threshold}$ has a value in the group of:
- 100 ppm ammonia $NH_3$;
- 50 ppm ammonia $NH_3$;
- 20 ppm ammonia $NH_3$;
- 10 ppm ammonia $NH_3$;
- 5 ppm ammonia $NH_3$; and
- 0 ppm ammonia $NH_3$.

23. A method for the treatment of an exhaust stream resulting from a combustion in a combustion engine, said method comprising:
a reduction of nitrogen oxides $NO_x$ in said exhaust stream through the use of a first reduction catalyst device comprising a first catalytic reduction catalyst and a first slip-catalyst, wherein said reduction is carried out with the use of compounds comprising one or more of carbon monoxide CO and hydrocarbons HC, which are comprised in said exhaust stream when said exhaust stream reaches said first reduction catalyst device, oxidation and/or disintegration of said compounds comprised in said exhaust stream by said first slip-catalyst, thereby said compounds assisting said first catalytic reduction catalyst with a further reduction of nitrogen oxides $NO_x$ in said exhaust stream and/or creation of an exothermic reaction; catching and oxidizing of soot particles in said exhaust stream with the use of a particulate filter, which is arranged downstream of said first reduction catalyst device; and
a control of supply of an additive comprising ammonia or a substance form which ammonia can be extracted and/or released into said exhaust stream, with the use of a second dosage device arranged downstream of said particulate filter, wherein said supply of said additive impacts a reduction of nitrogen oxides $NO_x$ in said exhaust stream through the use of said additive in a second reduction catalyst device, arranged downstream of said second dosage device.

24. The method according to claim 23, wherein:
an emission of compounds comprising one or more of carbon monoxide CO and hydrocarbons HC is made into said exhaust stream from said combustion engine; and
said reduction of nitrogen oxides $NO_x$ in said exhaust stream, through the use of said first reduction catalyst device, uses said emitted compounds comprising one or more of carbon monoxide CO and hydrocarbons HC in said exhaust stream.

25. The method according to claim 23, wherein:
a supply of compounds comprising one or more of carbon monoxide CO and hydrocarbons HC to said exhaust stream is carried out with the use of a first dosage device arranged downstream of said combustion engine and upstream of said first reduction catalyst device; and
said reduction of nitrogen oxides $NO_x$ in said exhaust stream, through the use of said first reduction catalyst device, uses said supplied compounds comprising one or more of carbon monoxide CO and hydrocarbons HC in said exhaust stream.

26. The method according to claim 23, wherein:
an emission of compounds comprising one or more of carbon monoxide CO and hydrocarbons HC into said exhaust stream is made from said combustion engine;
a supply of compounds comprising one or more of carbon monoxide CO and hydrocarbons HC to said exhaust stream is carried out with the use of a first dosage device arranged downstream of said combustion engine and upstream of said first reduction catalyst device; and
a reduction of nitrogen oxides $NO_x$ in said exhaust stream takes place through the use of said first reduction catalyst device, with the use of one or more of said supplied compounds and said emitted compounds, wherein said supplied compounds and said emitted compounds comprise one or more of carbon monoxide CO and hydrocarbons HC.

27. The method according to claim 23, comprising:
supply of one or several control signals, which may be used to control said combustion engine in such a manner, that a desired amount of said compounds comprising one or more of carbon monoxide CO and hydrocarbons HC will be emitted from said internal combustion engine.

28. The method according to claim 23, wherein said combustion engine is controlled to generate heat for heating of said first reduction catalyst device, to such an extent that said first reduction catalyst device reaches a predetermined temperature.

29. The method according to claim 23, wherein said reduction by way of said first reduction catalyst device is controlled to occur within a reduction temperature interval $T_{red}$, which at least partly differs from an oxidation temperature interval $T_{ox}$, within which said oxidation of incompletely oxidized carbon compounds by way of said particulate filter occurs; $T_{red} \neq T_{ox}$.

30. The method according to claim 23, wherein said reduction of nitrogen oxides $NO_x$ with said first reduction catalyst device is controlled, based on one or several characteristics and/or operating conditions for said first reduction catalyst device.

31. The method according to claim 23, wherein said reduction of nitrogen oxides $NO_x$ with said first reduction catalyst device is controlled, based on one or several characteristics and/or operating conditions for said second reduction catalyst device.

32. The method according to claim 23, wherein said reduction catalyst device with said second reduction catalyst device is controlled, based on one or several characteristics and/or operating conditions for said second reduction catalyst device.

33. The method according to claim 23, wherein said reduction with said second reduction catalyst device is controlled, based on one or several characteristics and/or operating conditions for said first reduction catalyst device.

34. The method according to claim 30, wherein said characteristics for said first, and second reduction catalyst device, respectively, are related to one or several from among the group of:
- catalytic characteristics for said first reduction catalyst device;
- catalytic characteristics for said second reduction catalyst device;
- catalyst type for said first reduction catalyst device;
- catalyst type for said second reduction catalyst device;
- a temperature interval within which said first reduction catalyst device is active;
- a temperature interval within which said second reduction catalyst device is active;
- a coverage level of carbon monoxide and/or hydrocarbon for said first reduction catalyst device; and
- a coverage level of ammonia for said second reduction catalyst device.

35. The method according to claim 23, wherein:
said first reduction catalyst device carries out a first reduction of a first amount of said nitrogen oxides $NO_{x\_1}$ reaching said first reduction catalyst device;
said second reduction catalyst device carries out a second reduction of a second amount of said nitrogen oxides $NO_{x\_2}$ reaching said second reduction catalyst device; and
an adaptation is carried out of a ratio $NO_{2\_2}/NO_{x\_2}$, between an amount of nitrogen dioxide $NO_{2\_2}$ and said second amount of nitrogen oxides $NO_{x\_2}$ reaching said second reduction catalyst device, wherein an active control of said first reduction of said first amount of nitrogen oxides $NO_{x\_1}$ is carried out, based on a value $(NO_{2\_2}/NO_{x\_2})_{det}$ for said ratio $NO_{2\_2}/NO_{x\_2}$.

36. The method according to claim 35, wherein said value $(NO_{2\_2}/NO_{x\_2})_{det}$ for said ratio $NO_{2\_2}/NO_{x\_2}$ consists of one from among the group:
- a measured value;
- a modelled value; and
- a predicted value.

37. The method according to claim 23, further comprising:
a first oxidation of compounds comprising one or more of nitrogen, carbon and hydrogen in said exhaust stream, which is carried out by a first oxidation catalyst, arranged upstream of said first reduction catalyst.

38. The method according to claim 23, further comprising:
a second oxidation of compounds comprising one or more of nitrogen, carbon and hydrogen in said exhaust stream, which is carried out by a second oxidation catalyst, arranged downstream of said first reduction catalyst and upstream of said particulate filter.

39. The method according to claim 23, further comprising:
a third oxidation of compounds comprising one or more of nitrogen, carbon and hydrogen in said exhaust stream, which is carried out by a third oxidation catalyst, arranged downstream of said particulate filter and upstream of said second reduction catalyst device.

40. The method according to claim 23, wherein said particulate filter at least partly comprises a catalytically oxidizing coating, arranged to oxidize one or more of nitrogen oxide NO and incompletely oxidized carbon compounds in said exhaust stream.

41. The method according to claim 23, wherein said particulate filter carries out a reduction of nitrogen oxides $NO_x$ with the use of an at least partly catalytically reducing coating arranged in said particulate filter.

42. The method according to claim 23, wherein said reduction with said first reduction catalyst device is controlled in such a manner, that a slip $HC/CO_{slip}$ of said compounds emitted from said reduction catalyst device is lower than or equal to a slip threshold value $HC/CO_{slip\_threshold}$; $HC/CO_{slip} \leq HC/CO_{slip\_threshold}$.

43. The method according to claim 42, wherein said control of said reduction comprises a control of one or more of:
- an emission of compounds comprising one or more of carbon monoxide CO and hydrocarbons HC into said exhaust stream from said combustion engine; and
- a supply of compounds comprising one or more of carbon monoxide CO and hydrocarbons HC to said exhaust stream, with the use of a first dosage device arranged downstream of said combustion engine and upstream of said first reduction catalyst device.

44. The method according to claim 42, wherein said slip threshold value $HC/CO_{slip\_threshold}$ has a value in the group of:
- 500 ppm of said compounds;
- 100 ppm of said compounds;
- 50 ppm of said compounds; and
- 10 ppm of said compounds.

45. The method according to claim 23, wherein said reduction with said first reduction catalyst device is controlled in such a manner, that a slip $NH_{3\_slip}$ of ammonia emitted from said reduction catalyst device is lower than or equal to an ammonia slip threshold value $NH_{3\_slip\_threshold}$; $NH_{3\_slip} \leq NH_{3\_slip\_threshold}$.

46. The method according to claim 45, wherein said control of said reduction comprises a control of one or more of:
- an emission of compounds comprising one or more of carbon monoxide CO and hydrocarbons HC into said exhaust stream from said combustion engine; and
- a supply of compounds comprising one or more of carbon monoxide CO and hydrocarbons HC to said exhaust stream, with the use of a first dosage device arranged downstream of said combustion engine and upstream of said first reduction catalyst device.

47. The method according to claim 45, wherein said ammonia slip threshold value $NH_{3\_slip\_threshold}$ has a value in the group of:
- 100 ppm ammonia $NH_3$;
- 50 ppm ammonia $NH_3$;
- 20 ppm ammonia $NH_3$;
- 10 ppm ammonia $NH_3$;
- 5 ppm ammonia $NH_3$; and
- 0 ppm ammonia $NH_3$.

48. A computer program product comprising computer program code stored on a non-transitory computer-readable medium, said computer program product for the treatment of an exhaust stream resulting from a combustion in a combustion engine, said computer program product comprising computer instructions to cause one or more computer processors to perform the following operations:

a reduction of nitrogen oxides $NO_x$ in said exhaust stream through the use of a first reduction catalyst device, wherein said reduction is carried out with the use of compounds comprising one or more of carbon monoxide CO and hydrocarbons HC, which are comprised in said exhaust stream when said exhaust stream reaches said first reduction catalyst device, wherein said first reduction catalyst device comprises a first catalytic reduction catalyst and a first slip-catalyst, wherein said first slip-catalyst is arranged to oxidize and/or disintegrate said compounds comprised in said exhaust stream, which, in turn, said compounds assist said first catalytic reduction catalyst with a further reduction of nitrogen oxides $NO_x$ in said exhaust stream and/or to create an exothermic reaction;

catching and oxidizing of soot particles in said exhaust stream with the use of a particulate filter, which is arranged downstream of said first reduction catalyst device; and a control of supply of an additive comprising ammonia or a substance from which ammonia can be extracted and/or released into said exhaust stream, with the use of a second dosage device arranged downstream of said particulate filter, wherein said supply of said additive impacts a reduction of nitrogen oxides $NO_x$ in said exhaust stream through the use of said additive in a second reduction catalyst device, arranged downstream of said second dosage device.

\* \* \* \* \*